(12) United States Patent
Yagi et al.

(10) Patent No.: US 8,283,060 B2
(45) Date of Patent: Oct. 9, 2012

(54) CRYSTALLIZED GLASS SUBSTRATE FOR INFORMATION RECORDING MEDIUM AND METHOD OF PRODUCING THE SAME

(75) Inventors: Toshitaka Yagi, Kanagawa (JP); Naoyuki Goto, Kanagawa (JP)

(73) Assignee: Ohara Inc., Kanagawa (JP)

( * ) Notice: Subject to any disclaimer, the term of this patent is extended or adjusted under 35 U.S.C. 154(b) by 2 days.

(21) Appl. No.: 12/792,030

(22) Filed: Jun. 2, 2010

(65) Prior Publication Data
US 2011/0135964 A1   Jun. 9, 2011

(30) Foreign Application Priority Data

| Jun. 4, 2009 | (JP) | 2009-135603 |
| Jun. 5, 2009 | (JP) | 2009-136742 |
| Mar. 2, 2010 | (JP) | 2010-045992 |
| Mar. 9, 2010 | (JP) | 2010-051242 |

(51) Int. Cl.
*G11B 5/73* (2006.01)
*C03C 3/12* (2006.01)
*C03C 3/21* (2006.01)
*C03B 27/012* (2006.01)

(52) U.S. Cl. ....... 428/846.9; 501/69; 501/123; 501/153; 65/33.1

(58) Field of Classification Search ............... 428/846.8, 428/848.3, 848.6, 846.9, 141; 360/99.12, 360/135, 136; 501/10, 63, 108, 4, 69, 123, 501/153; 65/33.1, 33.7
See application file for complete search history.

(56) References Cited

U.S. PATENT DOCUMENTS

| 5,476,821 | A | | 12/1995 | Beall et al. |
| 5,561,089 | A | | 10/1996 | Ishizaki et al. |
| 6,162,526 | A | * | 12/2000 | Kobayashi ..................... 428/141 |
| 6,387,509 | B1 | | 5/2002 | Goto et al. |
| 2002/0022564 | A1 | * | 2/2002 | Minamikawa et al. ........... 501/4 |
| 2002/0032113 | A1 | * | 3/2002 | Nakajima et al. ............... 501/10 |
| 2002/0039645 | A1 | * | 4/2002 | Kawai et al. .................. 428/210 |
| 2003/0099062 | A1 | * | 5/2003 | Kataoka et al. ............ 360/99.12 |
| 2004/0121893 | A1 | * | 6/2004 | Minamikawa et al. ........... 501/4 |

(Continued)

FOREIGN PATENT DOCUMENTS

CN    1237546 A    12/1999

(Continued)

OTHER PUBLICATIONS

European Search Report application No. 10005734 dated Nov. 17, 2010.

(Continued)

*Primary Examiner* — Kevin M. Bernatz
*Assistant Examiner* — Louis Falasco
(74) *Attorney, Agent, or Firm* — Hoffmann & Baron, LLP

(57) ABSTRACT

To provide a substrate for information recording medium having various properties, in particular higher fracture toughness, required for application of the substrate for information recording medium of the next generation such as perpendicular magnetic recording system, etc. and a material with excellent workability for such purpose. A crystallized glass substrate for information recording medium, consisting of a crystallized glass which comprises one or more selected from $RAl_2O_4$ and $R_2TiO_4$ as a main crystal phase, in which R is one or more selected from Zn, Mg and Fe, and in which the main crystal phase has a crystal grain size in a range of from 0.5 nm to 20 nm, a degree of crystallinity of 15% or less, and a specific gravity of 3.00 or less.

12 Claims, 4 Drawing Sheets

U.S. PATENT DOCUMENTS

| | | | |
|---|---|---|---|
| 2004/0266605 A1* | 12/2004 | Villalobos et al. | 501/108 |
| 2006/0216552 A1* | 9/2006 | Ikenishi et al. | 428/846.9 |
| 2007/0160877 A1* | 7/2007 | Ikenishi et al. | 428/846.9 |
| 2009/0061254 A1* | 3/2009 | Goela et al. | 428/640 |
| 2009/0118113 A1* | 5/2009 | Yagi | 501/63 |

FOREIGN PATENT DOCUMENTS

| | | |
|---|---|---|
| EP | 0 869 105 A1 | 10/1998 |
| EP | 0 940 806 A1 | 9/1999 |
| EP | 0 945 856 A2 | 9/1999 |
| EP | 0 997 445 A1 | 5/2000 |
| JP | 3-164445 | 7/1991 |
| JP | 07-300340 | 11/1995 |
| JP | 09-077531 | 3/1997 |
| JP | 2001-026460 A | 1/2001 |
| JP | 2001-504434 A | 4/2001 |
| JP | 2002-308647 A | 10/2002 |
| JP | 3420192 | 6/2003 |
| JP | 2007-217204 A | 8/2007 |
| JP | 2007-326722 | 12/2007 |
| WO | 2004/041740 A1 | 5/2004 |

OTHER PUBLICATIONS

Japanese Office Action Notice of Reasons for Rejection application No. JP 2010-051242 dated Nov. 2, 2010.

Notice of Reasons for Rejection issued to Japanese Application No. 2010-168283, mailed Jan. 25, 2011.

Notice of Reasons for Rejection issued to Japanese Application No. 2010-51242, mailed May 17, 2011.

Japanese Notice of Reasons for Rejection application No. 2010-051242 dated Jun. 1, 2010.

Office Action issued to Chinese Application No. 201010198062.X, mailed Jan. 18, 2012.

* cited by examiner

CRYSTALLIZED GLASS SUBSTRATE FOR INFORMATION RECORDING MEDIUM AND METHOD OF PRODUCING THE SAME

This application is based on and claims the benefit of priority from Japanese Patent Application Nos. 2010-51242, 2010-45992, 2009-136742 and 2009-135603, respectively filed on 9 Mar. 2010, 2 Mar. 2010, 5 Jun. 2009 and 4 Jun. 2009, the contents of which are incorporated herein by reference.

BACKGROUND OF THE INVENTION

1. Field of the Invention

The present invention relates to a crystallized glass substrate for achieving a higher recording density in future information magnetic recording medium and which has properties required for future information magnetic recording medium such as lower specific gravity, higher Young's modulus, superior fracture toughness, remarkably smooth surface roughness after processing, excellent head sliding properties, and excellent impact resistance.

In this connection, the term "information recording medium" referred to in the present application means an information magnetic recording medium which can be used in hard disks for various electronic devices.

2. Related Art

In recent years, large data files such as movie and audio files have been used in personal computers and various electronic devices; therefore, information recording devices with larger capacity have been required. As a result, there has been a demand for higher recording density of information recording media year by year.

To contribute to satisfying this demand, a perpendicular magnetic recording system has been employed and mass production thereof has been advanced. In the perpendicular magnetic recording system, heat resistance and surface smoothness of substrates are required to a level higher than that of current substrates. It is also more important nowadays that specific gravity be lowered to alleviate load placed on spindle motors, mechanical strength be enhanced to prevent disks from being damaged, and fracture toughness be enhanced to improve impact resistance with heads when dropped.

The material used for substrates of information recording media is exemplified by Al alloy, glass, and crystallized glass. Glass and crystallized glass are superior to Al alloys in view of higher Vickers hardness, higher surface smoothness, and the like, and thus have often been employed in applications where dynamic use is envisaged.

However, the crystallized glass in current use is provided with higher mechanical strength by virtue of crystals precipitated in glass phase, on the other hand, the crystallized glass exhibits a difference in processing between precipitated crystals and glass phases or a difference in etching rate. Therefore, the crystallized glasses currently being employed do not sufficiently satisfy requirements of surface roughness of Ra<2 angstroms, which is required of next generation substrates.

Furthermore, as the glass is brittle, defects originating at microcracks in the surface of substrates are likely to occur. Particularly, with the substrates for information recording medium used for the next generation of hard disks, resistance to crack propagation originating from microcracks in the surface of substrates, i.e., fracture toughness, has become an especially important evaluation point since the rotational speed of magnetic disks tends to be higher along with higher recording density. Therefore, the substrates for information recording medium are required to have higher fracture toughness. However, the glass substrates currently being employed do not easily satisfy such requirements, thus it is necessary to perform a step of chemical strengthening of the substrates after polishing.

Furthermore, when a material of glass or crystallized glass is used, a direct press process is employed to directly press molten glass for the purpose of producing a disk-shaped substrate having a thickness of 1 mm or less at lower cost.

In the direct press process, heretofore, arsenic or antimony component has been contained in the raw material as a clarifying agent to remove bubbles from the molten glass when melting the glass. However, it has been required in recent years to reduce the content of arsenic or antimony component or not to use them due to the possibility of adversely affecting human bodies and the environment. Nonetheless, when the arsenic or antimony component is substantially not used in the raw material and other clarifying components are used, there arises a problem in that bubbles in glass base material are generated or reboil during direct press occurs.

Patent Document 1 discloses a substrate for information recording medium consisting of a crystallized glass having a gahnite crystal phase. The substrate has a high fracture toughness, but surface roughness after polishing does not satisfy the level required for the substrate for information recording medium of the next generation. It is also impossible for the substrate for information recording medium of Patent Document 1 to satisfy the production cost required by the market due to lower polishing rate because of excessively high surface roughness and lower productivity because of requiring longer time for the polishing process.

It is also very difficult for the crystallized glass to control degree of crystallinity and grain size of precipitated crystal because of the inclination to rapidly generate crystal precipitation when crystallizing the raw glass through heat treatment. Details thereof will be explained later.

Patent Document 2 discloses a glass ceramic which contains a spinel type compound as a crystal phase. However, the melting temperature of the glass in Examples of Patent Document 2 is as high as from 1500 degree C. to 1650 degree C. and the highest crystallizing temperature is in a range of from 950 degree C. to 1000 degree C., therefore, mass productivity thereof is poor. In addition, surface roughness Ra of the resulting glass ceramic is 5.3 angstroms, which does not satisfy the desired surface property.

Patent Document 1: Japanese Unexamined Patent Application, First Publication No. H07-300340

Patent Document 2: Japanese Unexamined Patent Application, First Publication No. H09-077531

SUMMARY OF THE INVENTION

It is an object of the present invention to provide a substrate for an information recording medium having various properties, in particular higher fracture toughness, required for employing the substrate in information recording medium of the next generation such as perpendicular magnetic recording systems and the like, and a material with excellent workability for the purpose. It is another object of present invention to provide a substrate for information recording medium which is free from the generation of bubbles in the glass base material or which does not reboil during direct press process and is suited to the direct press process with higher productivity even substantially without using an arsenic component or antimony component which may adversely affect human bodies and the environment.

The present inventors have thoroughly investigated to attain the object described above, and as a result have found that a substrate for information recording medium which has various properties, in particular higher fracture toughness required in applications of the substrate for information recording medium of the next generation, exhibits good workability in a polishing process, and can be produced with higher productivity by way of controlling grain size and degree of crystallinity of precipitated crystallite into a certain range in a crystallized glass which contains one or more selected from $RAl_2O_4$ and $R_2TiO_4$ (R: one or more selected from Zn, Mg and Fe) (hereinafter referred to as "spinel type compound") as a main crystal phase. More specifically, the present invention provides those explained below. Here, the expression of "$RAl_2O_4$" or "$R_2TiO_4$" encompasses their solid solutions.

In a first aspect, a crystallized glass substrate for information recording medium, consisting of a crystallized glass Which comprises one or more selected from $RAl_2O_4$ and $R_2TiO_4$ as a main crystal phase, wherein R is one or more selected from Zn, Mg and Fe, and wherein the main crystal phase has a crystal grain size in a range of from 0.5 nm to 20 nm, a degree of crystallinity of 15% or less, and a specific gravity of 3.00 or less.

In a second aspect, the crystallized glass substrate for information recording medium according to the first aspect, comprises the components of
$SiO_2$ of from 40% to 60%,
$Al_2O_3$ of from 7% to 20%, and
RO of from 5% to 35% in terms of % by mass on the oxide basis, wherein R is one or more selected from Zn, Mg and Fe.

In a third aspect, the crystallized glass substrate for information recording medium according to the first or second aspect, comprises
a ZnO component of from 5% to 25% in terms of % by mass on the oxide basis.

In a fourth aspect, the crystallized glass substrate for information recording medium according to any one of the first to third aspect, comprises the components of
$TiO_2$ of from 1% to 15%, and
$R'_2O$ of from 2% to 15% in terms of % by mass on the oxide basis, wherein R' is one or more selected from Li, Na and K.

In a fifth aspect, the crystallized glass substrate for information recording medium according to any one of the first to fourth aspect, comprises the components of
$Li_2O$ of from 0% to 5%, and/or
$Na_2O$ of from 0% to 15%, and/or
$K_2O$ of from 0% to 10% in terms of % by mass on the oxide basis.

In a sixth aspect, the crystallized glass substrate for information recording medium according to any one of the first to fifth aspect, comprises the components of
$P_2O_5$ of from 0% to 7%, and/or
$B_2O_3$ of 0% or more and less than 8%, and/or
MgO of from 0% to 15%, and/or
CaO of from 0% to 15%, and/or
SrO of from 0% to 5%, and/or
BaO of from 0% to 5%, and/or
FeO of from 0% to 8%, and/or
$ZrO_2$ of from 0% to 10% in terms of % by mass on the oxide basis.

In a seventh aspect of the crystallized glass substrate for information recording medium according to any one of the first to sixth aspect, wherein a first compression stress layer is formed at one or both of outer periphery edge and inner periphery edge of the crystallized glass substrate for information recording medium.

In an eighth aspect of the crystallized glass substrate for information recording medium according to any one of the first to seventh aspect, wherein a second compression stress layer is formed at one or both of two main surfaces of the crystallized glass substrate for information recording medium and the thickness of the second compression stress layer is less than 30 μm.

In a ninth aspect of the crystallized glass substrate for information recording medium according to any one of the first to eighth aspect, wherein the crystallized glass contains one or both of $SnO_2$ and $CeO_2$ components and total of the both components is from 0.01% to 1.0% in terms of % by mass on the oxide basis.

In a tenth aspect of the crystallized glass substrate for information recording medium according to any one of the first to ninth aspect, wherein the crystallized glass contains no $As_2O_3$ or $Sb_2O_3$ component on the oxide basis and no $Cl^-$, $NO^-$, $SO^{2-}$, or $F^-$ component.

In an eleventh aspect of the crystallized glass substrate for information recording medium according to any one of the first to tenth aspect, wherein surface roughness Ra (arithmetic average roughness) of the substrate is 2 angstroms or less.

In a twelfth aspect of the crystallized glass substrate for information recording medium according to any one of the first to eleventh aspect, wherein fracture toughness $K_{1C}$ is 1.0 or more, Young's modulus is 85 GPa or more, and ratio of Young's modulus to specific gravity (Young's modulus/specific gravity) is 31.4 or more.

In a thirteenth aspect, an information recording medium uses the crystallized glass substrate for information recording medium according to any one of the first to twelfth aspect.

In a fourteenth aspect, a method of producing a crystallized glass substrate for information recording medium, comprises a step of preparing a glass substrate which contains
$SiO_2$ of from 40% to 60%,
$Al_2O_3$ of from 7% to 20%, and
RO of from 5% to 35% in terms of % by mass on the oxide basis, where R is one or more selected from Zn, Mg and Fe, and a step of precipitating one or more crystals selected from $RAl_2O_4$ and $R_2TiO_4$, where R is one or more selected from Zn, Mg and Fe, by heat-treating the glass substrate at a temperature of from 600 degrees C. to 750 degree C. for from 1 to 10 hours and then heat-treating at a temperature of from 650 degrees C. to 800 degree C. for from 1 to 10 hours.

In a fifteenth aspect, the method of producing a crystallized glass substrate for information recording medium according to the fourteenth aspect, further comprising a step of preparing an ion exchanged region by substituting an alkaline ion existing on the surface of the crystallized glass substrate for information recording medium with another ion having an ionic radius larger than that of the alkaline ion,
and a step of eliminating an ion exchanged region which exists at two main surfaces of the glass substrate.

The crystallized glass containing a spinel type compound or solid solution thereof as a main crystal phase has been proposed in past times as a material having a high mechanical strength in the application of information recording medium substrates or structural materials. However, it has previously been believed that higher degree of crystallinity is necessary for the crystallized glass to have higher mechanical strength. Consequently, crystal precipitates in the gahnite type crystallized glass proposed in past times have reached a level where visible light is not transmitted, and the specific gravity is as high as above 3.0, therefore, the glass is not suitable as a substrate for information recording medium of the next generation.

However, the present inventors have found that higher fracture toughness required of the substrate for information recording medium of the next generation can be attained even when the grain size of precipitated crystallite is very fine and the degree of crystallinity is lower, as described above.

That is, the crystallized glass substrate of the present invention has a visual-light permeability equivalent with that of pre-crystallized glass (parent glass) from visual observation, the precipitated crystal is sufficiently fine that a definite difference cannot be discerned between the two by appearance alone, and the degree of crystallinity is lower. Moreover, the substrate of the present invention surprisingly exhibits remarkably higher values in Young's modulus and fracture toughness compared to those of the pre-crystallized glass. Furthermore, the substrate of the present invention can easily exhibit a surface roughness of Ra<2 angstroms after a polishing process and the workability in the polishing process is not inferior to that of glass material.

Moreover, the glass does not denitrify at 1250 degree C. which corresponds to the molding temperature and at which the viscosity of molten glass is approximately 2.5 poises. It has also been found that the amount of precipitated crystals and their size can be easily controlled since crystal growth of the glass is very mild and that mass productivity of the material is good.

In accordance with the present invention, the substrate for information recording medium of the next generation can be provided which has specific gravity, Young's modulus, Vickers hardness, and surface smoothness, in particular higher fracture toughness, which are required of the substrate for information recording medium of the next generation, and the substrate exhibits good workability in the polishing process, and can enable higher productivity.

Furthermore, the substrate for information recording medium can be provided having more excellent effects than conventional ones such that clarification is possible even without using an arsenic component or antimony component which may adversely affect human bodies and the environment, and generation of reboil can be suppressed in cases of direct press shaping, etc.

FIG. 2 is a curve which is obtained by differential thermal analysis (DTA) of raw glass of the crystallized glass described in Patent Document 1. This is a curve having a shape characteristic of conventional crystallized glass containing a spinel type compound as a main crystal. In the curve of FIG. 2, the portion 21 represents a glass transition temperature, showing that the temperature is higher. Accordingly, when the raw glass of the crystallized glass of Patent Document 1 is pressed into a disk-shaped substrate by a direct press process, the molding temperature of the glass during the pressing must be higher to prevent the generation of devitrification and the glass viscosity is remarkably lowered during the molding. Therefore, it is not easy to carry out a shear cut while assuring high productivity (e.g. 2 seconds or less of cycle time) and to press into a thickness of 1 mm or less. Furthermore, portions 22, 23, 24 in the curve of FIG. 2 are respectively a 1st crystallizing peak, a 2nd crystallizing peak, and a 3rd crystallizing peak. These peaks have a feature of rapidly increasing; and the rapid increase of the peaks means that crystals are rapidly precipitated once crystal precipitation begins. In this way, the crystallized glass containing a spinel type compound as a main crystal proposed previously has two or more crystal precipitation peaks and their increase is rapid. Consequently, it is very difficult to precipitate only the desired crystal phase as well as to control the degree of crystallinity and the crystal grain size with high reproducibility.

Particularly, in the actual production of the substrate for information recording medium, crystallization is carried out by continuously moving a raw glass laid on a heat-stable mesh belt or roller within a tunnel type crystallization furnace. Detailed control of temperature condition is difficult in the crystallization furnace, therefore, provided that a fine crystal grain size and a low degree of crystallinity have been attained in a small furnace, it is difficult to repeat them in an actual production step.

Furthermore, heat absorption and heat generation appear during an increase in temperature at the portion 25 in the curve of FIG. 2, but heat absorption and heat generation during the increase in temperature means that the glass significantly tends to devitrify. From this reason, a considerable amount of heat and time is necessary in order to vitrify again the denitrified glass, thus a considerable amount of heat is necessary from batch charge to vitrification and the required time becomes longer, resulting in poor mass productivity.

FIG. 1 is a curve which is obtained by differential thermal analysis (DTA) of raw glass of the crystallized glass of Example 27 of the present invention. The portion 11 in the curve of FIG. 1 indicates a glass transition temperature, showing that the temperature is lower than that of FIG. 2. Accordingly, when the raw glass of the crystallized glass of the present invention is pressed into a disk-shaped substrate by a direct press process, it is easily pressed into a thickness of 1 mm or less while assuring high productivity (e.g. 2 seconds or less of cycle time) by virtue of good elongation of the glass during the pressing. Furthermore, the portion 12 in the curve of FIG. 1 represents a crystallizing peak. Only one peak appears in the crystallized glass of the present invention; moreover, the increase is mild and the peak height is lower, and the crystallizing peak extends over a broad temperature range. This means that the amount of crystal precipitation can be controlled into a very small amount while precipitating only the desired crystals of fine grain size by closely controlling the temperature and time at heat treatment due to the mild crystal precipitation. Consequently, with the crystallized glass of the present invention, it is easy to lower the degree of crystallinity and to precipitate fine crystals. These effects can be obtained more easily by adjusting the content of components which constitute the crystallized glass of the present invention. Particularly, these effects can be obtained more easily by including one or more components selected from $R'_2O$, $B_2O_3$, and $P_2O_5$ components.

DETAILED DESCRIPTION OF THE INVENTION

Figure 1:
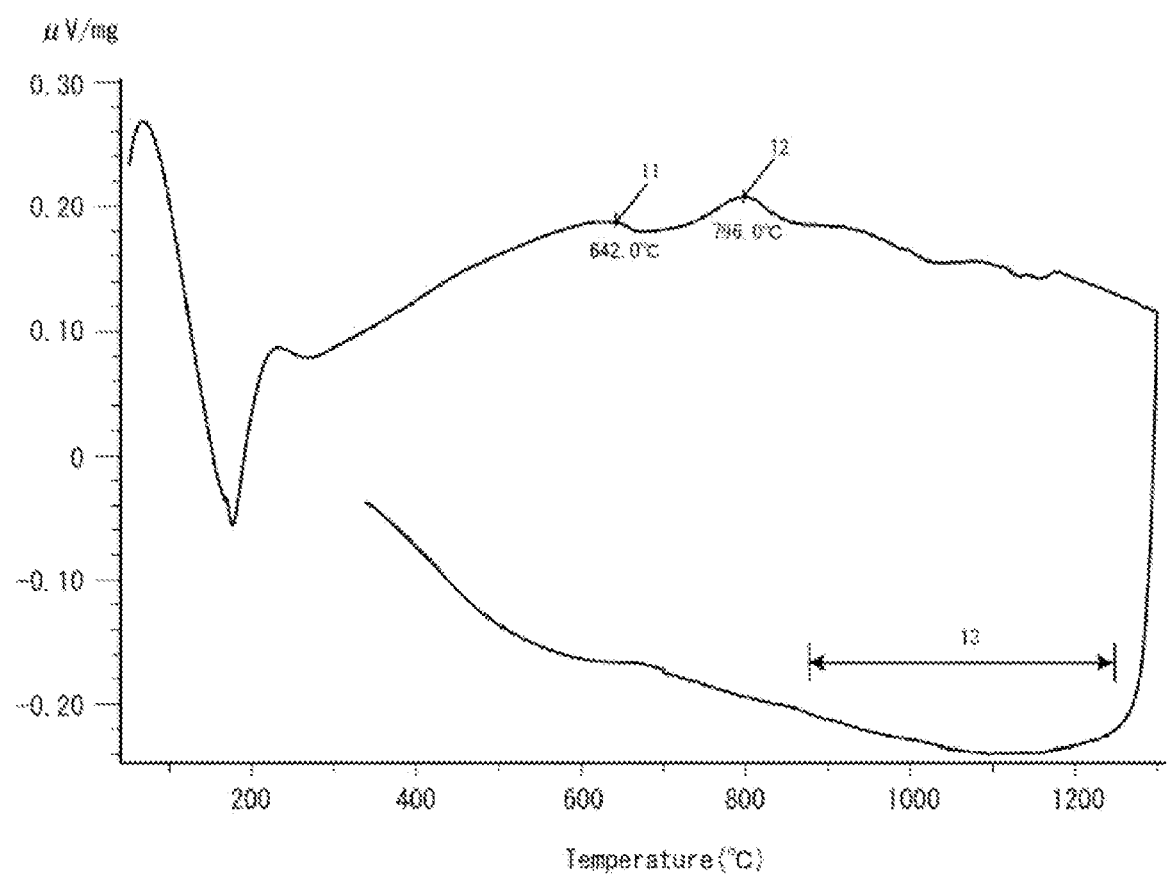
FIG. 1 is a curve which is obtained by differential thermal analysis (DTA) of raw glass of the crystallized glass of Example 27 of the present invention.
Figure 2:
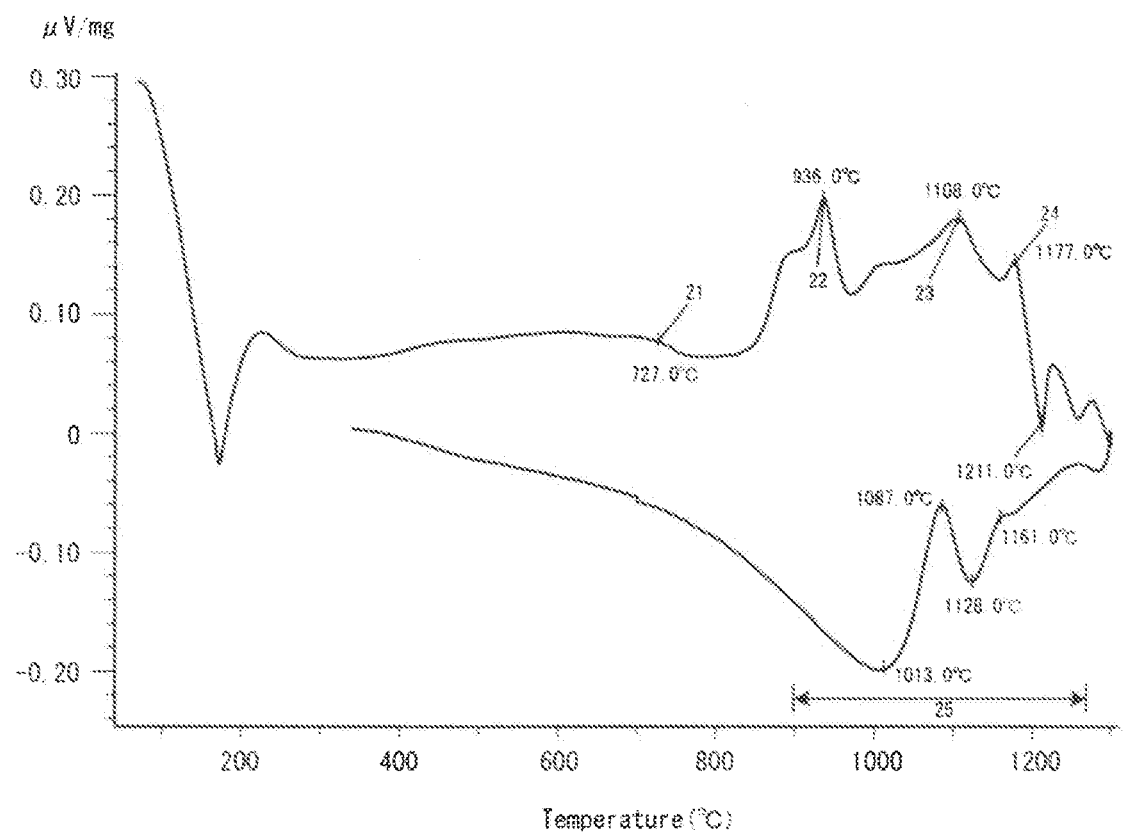
FIG. 2 is a curve which is obtained by differential thermal analysis (DTA) of raw glass of the crystallized glass described in Patent Document 1.
Figure 3:
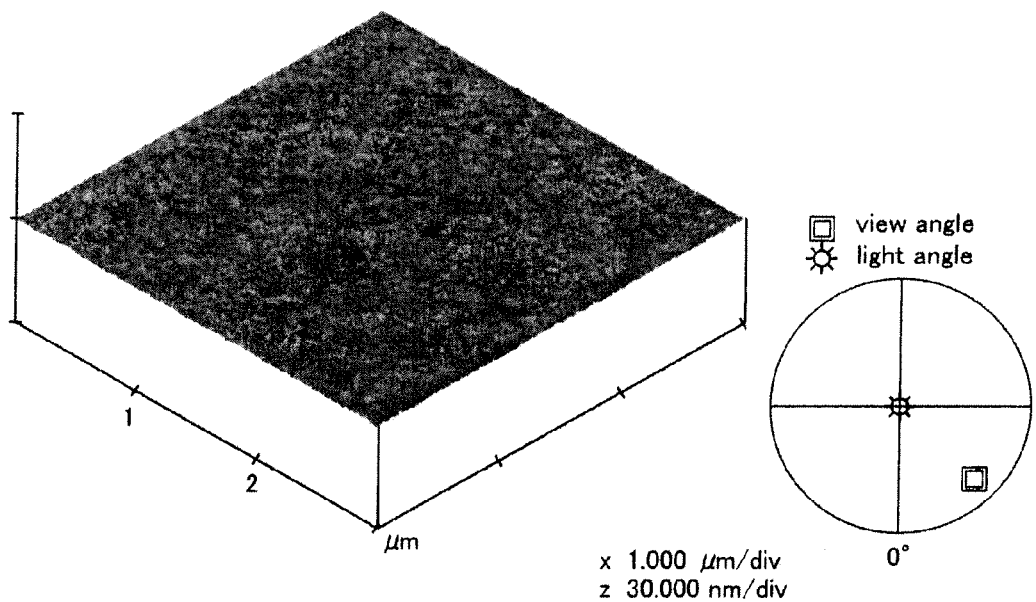
FIG. 3 is an AFM image of Example 14 of the present invention.
Figure 4:
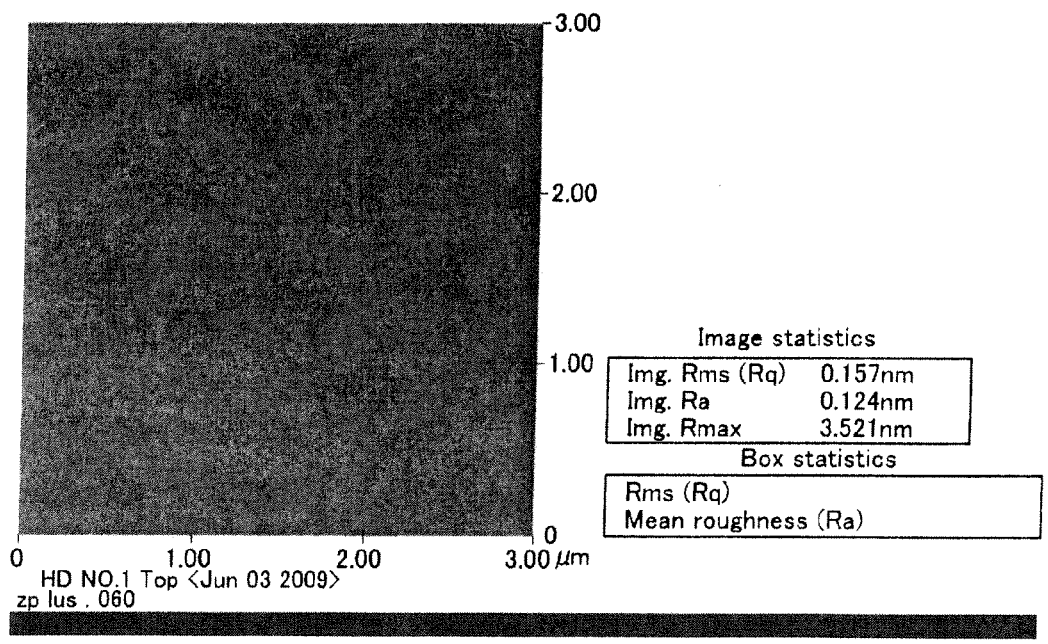
FIG. 4 is an AFM image of Example 14 of the present invention.
Figure 5:
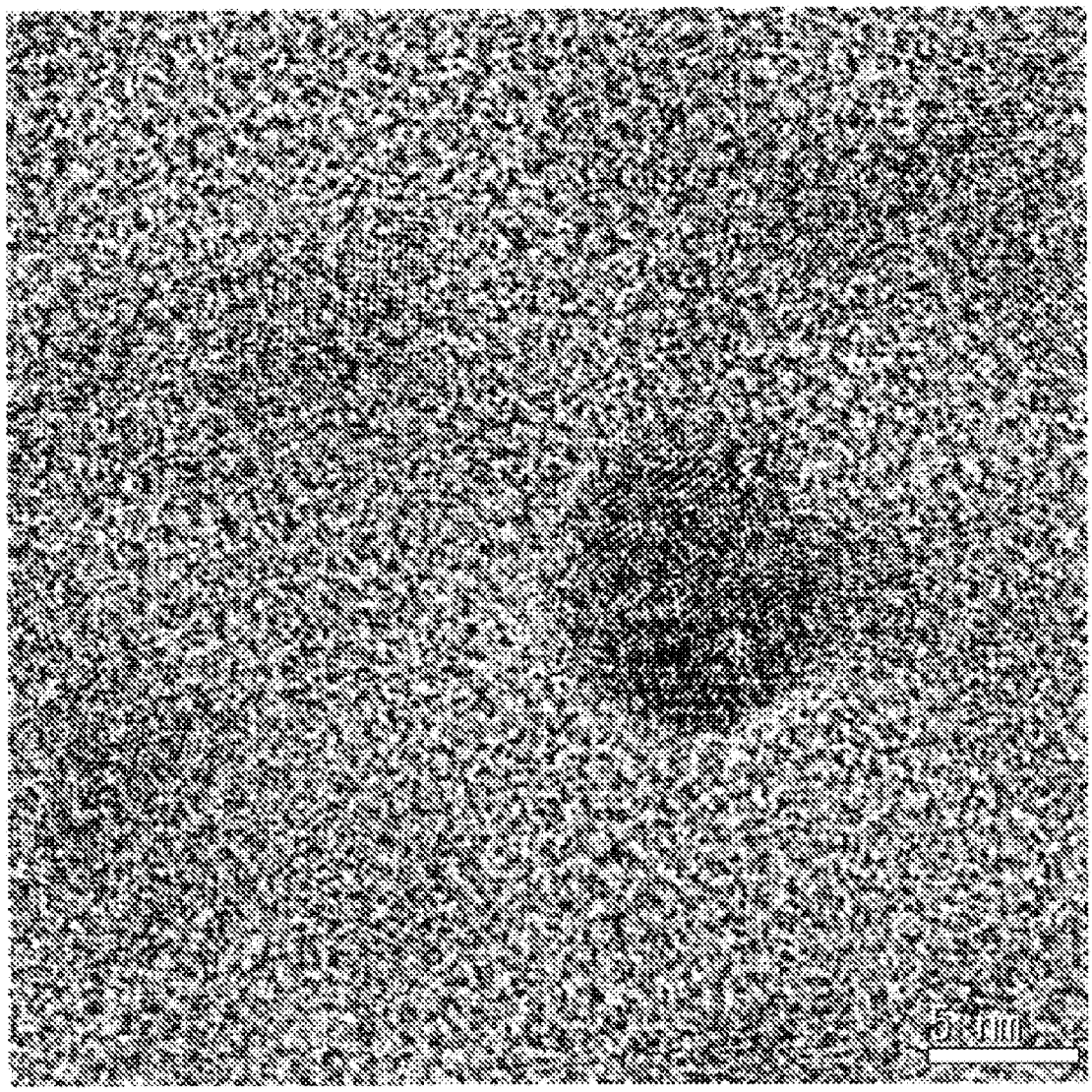
FIG. 5 is a TEM image of Example 14 of the present invention, and the reference line at lower right thereof indicates a distance of 5 nm.

The present invention is explained with reference to specific embodiments.

In the descriptions of the specification with respect to compositional components which constitute the crystallized glass substrate, the content of the components is expressed in terms of % by mass on the oxide basis unless especially noted otherwise. The term "on the oxide basis" as referred to herein is concerned with a means for expressing a composition of components contained in the crystallize glass of the present invention to express the amount of each component contained in the crystallized glass relative to 100% by mass of the total mass of resulting oxide, assuming that oxides, nitrates, etc., as raw material of the constitutional components of the crystallized glass, are entirely decomposed into oxides when molten.

The crystallized glass, constituting the crystallized glass substrate for information recording medium of the present invention, consists of a crystallized glass which contains one or more selected from $RAl_2O_4$ and $R_2TiO_4$ (R: one or more selected from Zn, Mg and Fe), of which the degree of crystallinity of precipitated crystals is from 1% to 15%, and of which the crystal grain size is from 0.5 nm to 20 nm. The crystallized glass, containing those described above as a main crystal phase, represents a crystal of spinel type structure and has an excellent Mohs hardness as high as 8 in the spinel itself, therefore, excellent mechanical strength can be attained. Furthermore, the ranges of degree of crystallinity and crystal grain size described above can result in well-balanced surface smoothness, Young's modulus, Vickers hardness, and mechanical strength such as fracture toughness which are required of the substrate for information recording medium of the next generation. In order to obtain the effects, the degree of crystallinity is more preferably from 2% to 14% and most preferably from 3% to 13%. Similarly, the crystal grain size is more preferably from 0.5 nm to 15 nm and most preferably from 0.5 nm to 10 nm. Similarly, in order to obtain the effects, the maximum grain size of the main crystal phase is preferably 30 nm or less, more preferably 20 nm or less, and most preferably 15 nm or less.

Here, the "main crystal phase" refers to a crystal phase which corresponds to a main peak (highest peak) in XRD diffraction. In the analysis of X-ray diffraction, gahnite and spinel ($MgAl_2O_4$) are hardly distinguishable from each other since the peaks appear at an identical angle. This fact is similar to the case of $R_2TiO_4$. In these cases, the contents of ZnO component and MgO component are compared in the composition of the crystallized glass, i.e. the composition of the raw glass, and gahnite ($ZnAl_2O_4$) or a zinc titanate compound ($Zn_2TiO_4$) is estimated as a main crystal phase when the content of ZnO component is higher.

The "degree of crystallinity" is obtained by summing the crystal amounts (% by mass) which are calculated from diffraction strength obtained by a powder XRD (X-ray diffraction) process using Rietveld method. The method described in "Crystal Analysis Handbook, Crystallographic Society of Japan, edited by the editorial committee" and "Crystal Analysis Handbook, published by Kyoritsu Shuppan Co., September 1999, p. 492-499" is employed as the Rietveld method.

The "crystal grain size" is defined as an average of longest distances between two parallel straight lines which sandwich crystals appearing in an image which is taken from an optional site by TEM (transmission electron microscope) at a magnification ratio of from 100,000 to 500,000. In this way, the number of n is 100.

The "maximum crystal grain size" is defined as a maximum value of longest distances between two parallel straight lines which sandwich crystals appearing in an image which is taken from an optional site by TEM (transmission electron microscope) at a magnification ratio of from 100,000 to 500,000. In this way, the number of n is 100.

Preferably, the crystallized glass substrate for information recording medium of the present invention does not contain forsterite ($Mg_2SiO_4$) or enstatite ($MgSiO_3$) or their solid solutions, which deteriorates polishing workability and degrades chemical resistance.

Vickers hardness is a value which represents a hardness of substrate surface, and the value is specifically obtained by measurement by the method below. That is, a four-sided pyramid diamond indenter with a face-to-face angle of 136° is pressed into at a load of 4.90 N for 15 seconds, and the value is obtained from dividing the load of 4.90 (N) by a surface area ($mm^2$) which is calculated from the length of an impressed recess. A microhardness tester MVK-E (manufactured by Akashi Seisakusho Co.) can be used for the measurement.

The value of the fracture toughness ($K_{1C}$) is obtained by a SEPB method (Single Edged Pre-cracked Beam, JIS R1607).

The value $K_{1C}$ of the fracture toughness is preferably 1.0 or more, more preferably 1.1 or more, and most preferably 1.2 or more for the purpose of an adequate substrate for information recording medium of the next generation.

With respect to the purpose of avoiding the effect of flattening in relation to higher revolution in recent years as much as possible, the flattening tends to be prevented by increasing the thickness of the substrate from the previous level of 0.635 mm to 0.8 mm in case of the substrate corresponding to 2.5 inches when the glass substrate has a Young's modulus of less than 85 GPa, for example. In view of the circumstances, the material which provides the substrate with higher Young's modulus, that is, the material which can achieve the usage under the thickness of substrate in the previous level of 0.6 mm has been required even in cases where the value of specific gravity of the substrate is higher to some extent. The present invention has achieved optimization of the value of specific gravity and Young's modulus in material design, in view of the circumstances, so that the specific gravity and mechanical strength are well-balanced to meet to the substrate for information recording medium of the next generation for the purpose of reducing the load on spindle motors.

Young's modulus is discussed below. As described above, the disk substrate of information recording medium has progressively undergone higher revolution to increase data transfer speed, and higher recording density; for the purpose of achieving such progression, the substrate material should be of higher rigidity and lower specific gravity in order to prevent disk vibration due to deflection during high speed revolution. Furthermore, in cases of taking head contact into consideration or when used for portable recording devices such as removable recording devices, it is preferable to have a mechanical strength, higher Young's modulus, and surface hardness which are sufficiently resistant thereto, and preferably, the Young's modulus is 85 GPa or more. The Young's modulus is more preferably 90 GPa or more, and most preferably 95 GPa or more. The crystallized glass substrate for information recording medium of the present invention can attain the Young's modulus of the range described above.

Young's modulus is discussed below. The specific gravity is preferably 3.00 or less in the crystallized glass substrate of the present invention. For the purpose of abovementioned better balance, the specific gravity of crystallized glass substrate is more preferably 2.95 or less, and most preferably 2.90 or less. On the other hand, when the specific gravity is less than 2.45, the substrate with a desired rigidity is substantially unobtainable within the compositional range of glass of the present invention, therefore, the specific gravity is preferably 2.45 or more, more preferably 2.48 or more, and most preferably 2.50 or more. The crystallized glass substrate for information recording medium of the present invention can attain the specific gravity of the range described above.

The substrate for information recording medium tends to induce deflection or generate vibration during high speed revolution due to larger weight if the specific gravity is larger even if the rigidity is merely higher. On the contrary, vibration similarly tends to generate if the rigidity is lower even if the specific gravity is lower. In addition, there arises a problem that power consumption increases due to gain of weight. Furthermore, excessively lower specific gravity results in difficulty to obtain the desired mechanical strength. Accordingly, apparently conflicting balance in properties must be attained so that specific gravity is lower although rigidity is higher. In addition, concerning the value expressed by [Young's modulus] (GPa)/[specific gravity] in order to achieve high speed revolution in the future, the preferable range of the value is 31.4 or more, more preferably 32.0 or more, and most preferably 33.0 or more. In this connection, it is more preferable that the value of specific modulus is higher, thus the upper limit is not particularly defined. The crystallized glass substrate for information recording medium of the present invention can attain the ratio of the range described above.

A $SiO_2$ component is an essential component from the viewpoints of forming a glass network structure, improving chemical stability, and achieving lower specific gravity. When the content thereof is less than 40%, it is likely that the resulting glass is poor in chemical resistance and the specific gravity is higher along with increasing the contents of other components. Therefore, the lower limit of the content is preferably 40%, more preferably 41%, and most preferably 42%. Furthermore, when the content is above 60%, dissolution and press molding are likely to be difficult along with increase of viscosity and the material uniformity and the clarifying effect tend to degrade. Therefore, the upper limit of the content is preferably 60%, more preferably 59%, and most preferably 58%.

An $Al_2O_3$ component is one of components which constitute the main crystal phase through the heat treatment of raw glass and an important component which contributes to stabilize glass and to improve the chemical resistance, but the effect is poor when the content is less than 7%. Therefore, the lower limit of the content is preferably 7%, more preferably 9%, and most preferably 11%. Furthermore, the content of above 20% tends to deteriorate meltability, moldability, and devitrification and to degrade the uniformity and the clarifying effect. Therefore, the upper limit of the content is preferably 20%, more preferably 19%, and most preferably 18%.

A RO component (R: one or more selected from Zn, Mg and Fe) is a component which constitutes the main crystal phase through the heat treatment of raw glass and an important component which also contributes to stabilize glass. When the total content is insufficient, mass productivity is impaired due to higher viscosity of raw material and also the desired crystal phase is unlikely to be obtainable. Therefore, the lower limit of the content is preferably 5%, more preferably 8%, and most preferably 11%. On the other hand, the total content of above 35% tends to make vitrification difficult and also to induce precipitation of insoluble matters and an increase in devitrification temperature. Therefore, the upper limit of the content is preferably 35%, more preferably 33%, and most preferably 31%.

A ZnO component is one of components which constitute the main crystal phase through the heat treatment of raw glass and a component which contributes to lower the specific gravity of glass and to increase Young's modulus and also is effective to lower the viscosity of glass. But the effect is unobtainable when the content is less than 5%. Therefore, the lower limit of the content is preferably 5%, more preferably 6%, and most preferably 8%. Furthermore, when the content of ZnO component is above 25%, crystal precipitation from the raw material becomes unstable and crystal particles tend to be coarsely large. Therefore, the upper limit of the content is preferably 25%, more preferably 23%, and most preferably 21%.

An MgO component is one of components which constitute the main crystal phase through the heat treatment of raw glass and a component which contributes to lower the specific gravity of glass and to increase Young's modulus and a component effective also to lower the viscosity of glass, and thus can be optionally added. However, when the content is above 15%, not only the desired glass is unobtainable due to higher specific gravity of the raw glass but also insoluble matters may precipitate. Therefore, the upper limit of the content is preferably 15%, more preferably 14%, and most preferably 13%.

An FeO component is one of components which constitute the main crystal phase through the heat treatment of raw glass and forms a spinel compound together with the $Al_2O_3$ or $TiO_2$ component. Furthermore, it is a compound to act as a clarifying agent, but it alloys with the platinum typically used when melting the glass. Therefore, the upper limit of the content is preferably 8%, more preferably 6%, and most preferably 4%.

A $TiO_2$ component is a component which plays a role in forming nuclei to precipitate a spinel compound and a component which contributes to increase Young's modulus, to lower the viscosity, and to improve the chemical resistance of the glass. In addition, it is one of components which constitute the main crystal phase through the heat treatment of raw glass. But when the additive content of this component is above 10%, the specific gravity of glass becomes higher and further vitrification is difficult. Therefore, the upper limit of the content is preferably 10%, more preferably 9%, and most preferably 8%.

On the other hand, when the content of $TiO_2$ component is less than 1%, the formation of nuclei does not occur through heat treatment. Therefore, the lower limit of the content is preferably 1%, more preferably 2%, and most preferably 3%.

A $ZrO_2$ component is a component, similarly as the $TiO_2$ component, which plays a role of forming nuclei to precipitate the main crystal phase and a component which contributes to increase Young's modulus and to improve the chemical resistance of the glass, thus can be added optionally. But when the additive content of this component is above 2%, insoluble residues or $ZrSiO_4$ (zircon) tends to generate when melting the glass and the specific gravity of glass becomes higher. Therefore, the upper limit of the content is preferably 10%, more preferably 8%, and most preferably 6%.

A $B_2O_3$ component contributes to lower the viscosity of glass and improves meltability and moldability, thus can be added as an optional component. Additionally, the $B_2O_3$ component can suppress excessive crystal growth from the inside of glass as much as possible and thus can precipitate a desired crystal phase inside the glass as fine particles in the order of a few nanometers and also is an effective component to precipitate uniformly under a crystallizing temperature condition of lower temperatures, thus is preferably included. The content in this case is preferably 0.5% or more, and most preferably 1.0% or more. But when the component is 8% or more, it becomes difficult to satisfy the mechanical properties and the precipitation of desired crystal is suppressed. Moreover, the raw glass easily causes phase separation and vitrification becomes difficult. Therefore, the upper limit of the content is preferably less than 8%. The upper limit is more preferably 7%.

A $R'_2O$ component (R': one or more selected from Li, Na and K) is a component which lowers the viscosity of glass, improves moldability, and improves uniformity. Furthermore, when the $R'_2O$ component is included, additional properties can be added by exchanging alkaline metal ions at the surface after forming the substrate. When the content of the $R'_2O$ component is less than 2% (sum of the components of $Li_2O$, $Na_2O$ and $K_2O$), the effects cannot be obtained. Therefore, the lower limit of the content is preferably 2%. Furthermore, it is necessary for the substrate for information recording medium that elution of alkaline components is limited from the surface, therefore, the upper limit of the content of the $R'_2O$ component is preferably 15%, more preferably 13%, and most preferably 11% for the purpose of limiting the elution of alkaline components to a minimum.

The content of the components of $Li_2O$, $Na_2O$ and $K_2O$ is explained below.

The $Li_2O$ component is an optional component and the upper limit is preferably 2% since higher content thereof makes difficult to obtain the desired crystal phase.

The $Na_2O$ component is an optional component and the upper limit is preferably 15%, more preferably 12%, and most preferably 10% since higher content thereof makes it difficult to obtain the desired crystal phase.

The $K_2O$ component is an optional component and the upper limit is preferably 10%, more preferably 8%, and most preferably 5% since higher content thereof makes it difficult to obtain the desired crystal phase.

Here, the $Na_2O$ component is a component which is unlikely to cause an adverse affect such as excessive crystal precipitation when precipitating the desired crystal phase compared to other alkaline components as well as an important component to promote chemical strengthening of the substrate through immersion into a molten salt while maintaining appropriately the chemical resistance of the material. It is therefore more preferred that at least the $Na_2O$ component is included as the $R'_2O$ component.

A CaO component is a component which contributes to lower the specific gravity of glass and to increase Young's modulus and a component effective also to lower the viscosity of glass, therefore, can be added as an optional component. But when the CaO component is above 15%, the desired glass is likely to be unobtainable due to higher specific gravity of the raw glass. Therefore, the upper limit of the content is preferably 15%, more preferably 12%, and most preferably 9%.

BaO or SrO component is a component which is effective to lower the viscosity of glass, to improve the chemical resistance, and to improve the mechanical strength and acts similarly as MgO, CaO, etc., but is a component liable to increase the specific gravity of glass. Therefore, the upper limit of the content of the components is preferably 5%, more preferably 4%, and most preferably 3%, respectively.

A $P_2O_5$ component represents an effect to suppress crack propagation of glass thus can contribute to raise Vickers hardness. Besides, it contributes to lower the viscosity and can improve meltability and clarifying ability under coexistence with $SiO_2$. In order to obtain these effects, the $P_2O_5$ component may be optionally included, and the content is more preferably 0.2% or more, and most preferably 0.4% or more. However, when the component is added excessively, vitrification is difficult and devitrification or phase separation tends to occur. Therefore, the upper limit of the content is preferably 7%, more preferably 6%, and most preferably 5%.

In order to maintain the properties required of the substrate for information recording medium and to obtain a high clarifying effect, it is preferred that one or more components selected from $SnO_2$ and $CeO_2$ components is included as a main clarifying agent. In order to obtain a high clarifying effect, the lower limit of the content of $SnO_2$ or $CeO_2$ component or the total content of the both components on the oxide basis is preferably 0.01%, more preferably 0.1%, and most preferably 0.15%.

On the other hand, in order to maintain the mechanical strength, to lower the specific gravity, to obtain the high clarifying effect, and to enhance the reboil suppression effect during direct press, the upper limit of the content of one or more selected from $SnO_2$ and $CeO_2$ components is preferably 1%, more preferably 0.7%, and most preferably 0.5%.

An $As_2O_3$ or $Sb_2O_3$ component, and a $Cl^-$, $NO^-$, $SO^{2-}$, or $F^-$ component are a component to act as a clarifying agent but also a possibly environmentally harmful component, thus usage thereof should be restrained. The glass of the present invention can obtain the clarifying effect even without containing the $As_2O_3$ or $Sb_2O_3$ component; when these components and the component of clarifying agent in accordance with the present invention are added, the clarifying effect of each may be canceled by the clarifying agents.

Furthermore, a PbO component is an environmentally harmful component and also a component to raise the specific gravity of glass, thus is preferably not included. The glass of the present invention can be prevented from excessive precipitation of crystals and improved for meltability even without containing the PbO component, and glass stability can be appropriate during the molding.

A $Cs_2O$ component is expensive as for the cost of raw material and is a component difficult to undergo a chemical strengthening due to a larger ionic radius, thus is preferably not included.

$Gd_2O_3$, $La_2O_3$, $Y_2O_3$, $Nb_2O_5$, $Ga_2O_3$, and $WO_3$ components contribute to lower the viscosity of glass, to improve the mechanical strength due to higher Young's modulus, and to improve the chemical resistance, and thus can be added as an optional component, but higher additive amount thereof leads to an increase in specific gravity and an increase in the cost of raw materials. Accordingly, it is sufficient that the total content of one or more of these components is up to 5%. When the total content is above 5%, specific gravity, Young's modulus, and specific rigidity modulus are unsatisfactory. Accordingly, the upper limit of the total content of these components is preferably 5%, more preferably 4%, and most preferably 3%.

The components, used as a coloring component of glass, such as V, Cu, Mn, Cr, Co, Mo, Ni, Te, Pr, Nd, Er, Eu and Sm can be added for the purpose of preventing confusion with other kinds of glass in production systems by determining the kind of glass by use of a coloring property and a fluorescence property induced from these components. However, these components lead to an increase in specific gravity, increase in the cost of raw materials, and degradation of glass formability. Therefore, it is sufficient that the total content of one or more of these components is up to 5%. Accordingly, the upper limit of the total content of these components on the oxide basis is preferably 5%, more preferably 4%, and most preferably 3%.

In the crystallized glass substrate of the present invention, damages due to alkaline migration into a magnetic film formed at the surface of the substrate can be suppressed by exchanging the ions at the surface of the substrate with those of other components having a larger ionic radius.

Furthermore, breakages of the substrate from the starting point of micro cracks which are generated upon processing the edges of the substrate can be suppressed.

In particular, the alkaline migration is often caused by the elution of alkaline components from the edges of the substrate where magnetic film, etc. is not formed.

It is therefore preferred that the content of Li component is decreased in the vicinity of the edges of the substrate in particular; specifically, it is preferred to satisfy the following relation: $\alpha/\beta \leqq 1$, in which $\alpha\%$ is the content of Li component on the oxide basis at the region which extends from the edge to 5 μm inside toward the center direction (hereinafter referred to as "edge region") of the glass substrate for information recording medium, and β% is the content of Li component on the oxide basis at the region which extends from the two main surfaces to 5 μm or more inside in the thickness direction as well as at the region which extends above 5 μm inside toward the center direction from the edge of the substrate (hereinafter referred to as "inside region") of the glass substrate for information recording medium.

In the case that the composition includes no Li component, the content of Na component may be confirmed by the method described above.

In an actual measurement, for example, a part of glass is sampled from an edge region and an inside region, and the content of Li component may be measured mainly by an ICP-AES (Inductively Coupled Plasma-Atomic Emission Spectrometry) method.

In an actual production, a polished substrate is subjected to ion exchange treatment to exchange $Li^+$ or $Na^+$ into other components such as $Na^+$ or $K^+$, thereby the content of Li or Na component can be adjusted to the range described above. Thereby, first compression stress layer is formed at one or both of outer periphery edge and inner periphery edge of the substrate, and second compression stress layer is formed at one or both of two main surfaces of the substrate. In the case of crystallized glass, more desirable strength can be attained by the ion exchange treatment in addition to the higher mechanical properties obtained by the precipitated crystal. In this case, the compression stress layer, due to the ion exchange treatment (chemical strengthening), formed at the two main surfaces of the crystallized glass substrate (second compression stress layer) can achieve sufficient strength even when of a thickness of less than 30 μm.

Furthermore, the glass substrate of the present invention can obtain an effect to improve the mechanical strength still more by providing the compression stress layer at the surface.

The method to form the compression stress layer is exemplified by a chemical strengthening method in which an alkaline component, existing at the surface layer of the glass substrate before forming the compression stress layer, is exchanged to another alkaline component with an ionic radius larger than that of the alkaline component. Furthermore, a thermal strengthening method in which the glass substrate is heated and then quenched and an ion injection method in which an ion is injected to the surface layer of the glass substrate are proposed.

The chemical strengthening method is exemplified by the method of immersing into a molten salt containing potassium or sodium such as potassium nitrate ($KNO_3$) and sodium nitrate ($NaNO_3$) or a molten complex salt thereof at a temperature of from 300 degree C. to 600 degree C. for 0.1 to 12 hours. Thereby, the lithium component ($Li^+$ ion) existing in glass components near the surface of the substrate causes an exchange reaction between a sodium component ($Na^+$ ion) or a potassium ion ($K^+$ ion) of an alkaline component having an ionic radius larger than that of the lithium component, or the sodium component ($Na^+$ ion) existing in glass components near the surface of the substrate causes an exchange reaction between a potassium component of an alkaline component having an ionic radius larger than that of the sodium component, then a volume gain occurs in the crystallized glass, therefore, a compression stress generates in the surface layer of the glass substrate. As a result, a ring flexural strength increases which is an index of impact properties.

The thermal strengthening method, which is not specifically limited, is exemplified by the method of heating the glass substrate to from 300 degree C. to 600 degree C. followed by a rapid cooling such as of water and/or air cooling. Thereby, the compression stress layer can be formed by the difference of temperatures between the surface and the inside of the glass substrate. In addition, the compression stress layer can be formed more efficiently by combining with the chemical treatment method described above.

More specifically, the glass substrate for information recording medium of the present invention is produced by the following method.

Initially, the raw material such as oxides, carbonates, and nitrates is mixed to include the components to constitute the glass in the compositional range described above, then the raw material is melted using a usual melting device with a crucible of platinum, quartz, etc. at a temperature where the viscosity of glass melt is from 1.5 to 3.0 dPa·s.

Then the temperature of glass melt is raised to a temperature where the viscosity is from 1.0 to 2.3 dPa·s preferably from 1.2 to 2.2 dPa·s, and bubbles are generated within the glass melt to induce a stirring effect and uniformity of the glass melt is enhanced.

Thereafter, the temperature of the glass melt is lowered to a temperature where the viscosity is from 1.8 to 2.6 dPa·s, preferably from 2.0 to 2.5 dPa·s, and bubbles generated inside the glass are eliminated and clarifying is performed, then the temperature is maintained.

The molten glass, prepared under the conditions described above, is added dropwise to a lower mold and the molten glass is pressed by an upper and lower mold (direct press) thereby to form into a disk shape of a thickness of about from 0.7 mm to 1.2 mm. Specifically, the temperature of upper mold of the press shaping mold is set to 300±100 degree C., preferably 300±50 degree C., and the temperature of lower mold is set to glass Tg±50 degree C., preferably glass Tg±30 degree C.

Additionally, the temperature of a glass flow pipe to direct the glass from a crucible to the press shaping mold is set to a temperature where the viscosity of the glass is from 2.0 to 2.6 dPa·s, preferably from 2.1 to 2.5 dPa·s, the glass is added dropwise to the lower mold in a predetermined amount, and the upper mold and the lower mold are made close each other to obtain a disk-shaped glass shaped body.

In the production of the substrate for information recording medium, cost reduction is required per one substrate, therefore, the press is performed at high speed such as from 150 to 700 mm/sec of press speed and from 1 to 2 seconds of cycle time (time from starting a press to starting the next press). Even under the impact during the pressing, generation of the reboil during the pressing can be suppressed by using the glass of the present invention and controlling the temperatures of glass melt and the temperatures of production devices as described above.

Besides, the disk-shaped glass can be produced by the method of slicing a glass body formed into a column shape, the method of cutting out a glass sheet, prepared by a float method, into a circular shape, and the like. In this connection, the production by the direct press is most preferable in view of production efficiency.

Then the resulting disk-shaped glass is subjected to heat treatment to generate crystals. It is preferred that the heat treatment is performed at two stage temperatures. That is, a nucleus formation step is performed by heat-treating at a 1st temperature (nucleation temperature), and then a crystal growth step is performed by heat-treating at a 2nd temperature (crystal growth temperature) higher than that of the nucleus formation step.

It is preferred in the crystallizing step that a disk-shaped ceramic setter and a disk-shaped glass are stacked alternatively to sandwich the glasses by the setters (number of setters is number of glasses plus one) in view of enhancing the flatness of the disk.

The preferable conditions of heat treatment to attain the grain size and the degree of crystallinity of precipitated crystal in accordance with the present invention are as follows.

Maximum temperature of the heat treatment of the 1st stage is preferably from 600 degree C. to 750 degree C. Heat treatment of the 1st stage may be abbreviated. Maximum temperature of the heat treatment of the 2nd stage is preferably from 650 degree C. to 850 degree C.

Holding time at the 1st temperature is preferably from 1 to 10 hours.

Holding time at the 2nd temperature is preferably from 1 to 10 hours.

Next, shaping processes such as hole cutting at a central portion and edge polishing at outer periphery and inner periphery are applied, and a lapping or polishing process may be applied by a publicly known process. The conventional crystallized glass containing gahnite as a main crystal phase has a higher hardness, therefore, free abrasive grains with a higher hardness such as zirconia, alumina, and diamond grains are necessary when the main surface undergoes mirror polishing and thus a longer time is necessary for the processing time. Additionally, scratches tend to generate at the finished surface since the free abrasive grains with a higher hardness are used, and it is therefore very difficult to obtain a surface property in terms of Ra of 2 angstroms or less. The crystallized glass substrate of the present invention can be polished using inexpensive free abrasive grains such as colloidal silica and cerium oxide and the processing time may be short (from 30 to 90 minutes). In accordance with the present invention, the surface property in terms of Ra of 2 angstroms or less can be attained by using currently established processing methods such as polishing. Furthermore, even when being cleaned using acid or alkaline, e.g. hydrofluoric acid, for removing residual abradants at polishing processes, the surface property in terms of Ra of 2 angstroms or less can be maintained.

EXAMPLES

Preferable examples of the present invention are explained in the following.

The glasses of the examples of the present invention were all prepared by mixing a raw material of oxides, carbonates, etc. and dissolving them in a quartz or platinum crucible at a temperature of about 1250 degree C. to 1450 degree C. to sufficiently melt the batch of raw material without generating molten residues. Then the molten raw material was heated to a temperature of about 1350 degree C. to 1500 degree C. followed by lowering the temperature to 1450 degree C. to 1250 degree C. to eliminate bubbles generated inside the glass and to perform clarifying. Thereafter, a predetermined amount of the glass was flowed out while being maintained at a constant temperature; and a glass shaped body was obtained in a direct press system by setting the temperature of upper mold to 300±100 degree C. and the temperature of lower mold to Tg±50 degree C., and molding the glass into a disk shape using these upper and lower molds followed by cooling. Then the resulting glass shaped body was lapped and polished using the methods described above followed by cleaning with hydrofluoric acid for removing abrasives to obtain a substrate for information recording medium. The surface roughness Ra (arithmetic average roughness) of the substrate was entirely 2 angstroms or less in this stage. In this connection, the surface roughness Ra (arithmetic average roughness) was measured by an atom force microscope (AFM).

Tables 1 to 10 show composition of crystallized glass (% by mass), specific gravity of press-shaped substrate, Vickers hardness, Young's modulus, ratio of Young's modulus to specific gravity (E/ρ), average linear expansion coefficient (α) at from 25 degree C. to 100 degree C., degree of crystallinity (% by mass), crystal grain size (nm), and maximum crystal grain size (nm) of Examples 1 to 61 and Comparative Examples 1 to 3.

Furthermore, the average linear expansion coefficient refers to a value measured by changing the temperature in a range of from 25 degree C. to 100 degree C. in accordance with JOGIS (Japan Optical Glass Industrial Society Standard) 16-2003 "Measuring Method for Average Linear Thermal Expansion Coefficient of Optical Glass at near Room Temperature".

The specific gravity was measured using Archimedes method and the Young's modulus was measured using an ultrasonic method.

The Vickers hardness was indicated by a value of dividing a load (N), to make a pyramid-shaped indentation on a test surface using a four-sided pyramid diamond indenter with a face-to-face angle of 136°, by the surface area (mm$^2$) calculated from the length of the indentation. A microhardness tester MVK-E (manufactured by Akashi Seisakusho Co.) was used under a test load of 4.90 (N) and a holding time of 15 seconds.

TABLE 1

| Composition (% by mass) | Example 1 | Example 2 | Example 3 | Example 4 | Example 5 | Example 6 | Example 7 |
|---|---|---|---|---|---|---|---|
| $SiO_2$ | 47.60 | 43.60 | 43.60 | 45.60 | 45.60 | 50.60 | 49.60 |
| $P_2O_5$ | 0.00 | 0.00 | 0.00 | 0.00 | 0.00 | 0.00 | 0.00 |
| $Al_2O_3$ | 18.00 | 18.00 | 18.00 | 18.00 | 18.00 | 18.00 | 18.00 |
| $B_2O_3$ | 0.00 | 0.00 | 0.00 | 0.00 | 0.00 | 1.00 | 0.00 |
| $Li_2O$ | 2.00 | 2.00 | 2.00 | 2.00 | 2.00 | 0.00 | 0.00 |
| $K_2O$ | 0.00 | 0.00 | 0.00 | 0.00 | 0.00 | 0.00 | 0.00 |
| $Na_2O$ | 0.00 | 0.00 | 2.00 | 0.00 | 0.00 | 2.00 | 4.00 |
| MgO | 10.00 | 12.00 | 11.00 | 10.00 | 10.00 | 8.00 | 8.00 |
| CaO | 0.00 | 0.00 | 0.00 | 0.00 | 0.00 | 0.00 | 0.00 |

TABLE 1-continued

| Composition (% by mass) | Example 1 | Example 2 | Example 3 | Example 4 | Example 5 | Example 6 | Example 7 |
|---|---|---|---|---|---|---|---|
| BaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 16.00 | 18.00 | 17.00 | 16.00 | 16.00 | 14.00 | 14.00 |
| $ZrO_2$ | 0.00 | 0.00 | 0.00 | 0.00 | 2.00 | 0.00 | 0.00 |
| $TiO_2$ | 6.00 | 6.00 | 6.00 | 8.00 | 6.00 | 6.00 | 6.00 |
| $Fe_2O_3$ | 0.00 | 0.00 | 0.00 | 0.00 | 0.00 | 0.00 | 0.00 |
| $CeO_2$ | 0.40 | 0.40 | 0.40 | 0.40 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 670 | 670 |
| Crystal growth temperature (° C.) | 750 | 750 | 750 | 750 | 750 | 770 | 750 |
| Specific gravity after crystallization | 2.872 | 2.890 | 2.885 | 2.883 | 2.856 | 2.852 | 2.857 |
| Vickers hardness | 730 | 730 | 740 | 740 | 740 | 740 | 750 |
| Young's modulus (Gpa) | 105 | 108 | 105 | 105 | 106 | 103 | 103 |
| E/ρ | 35.6 | 37.4 | 36.4 | 36.4 | 37.1 | 36.1 | 36.1 |
| $\sigma$ ($\times 10^{-7}$/° C.) (25° C.-100° C.) | 52 | 55 | 53 | 54 | 54 | 55 | 58 |
| Degree of crystallinity (% by mass) | 4 | 6 | 5 | 7 | 6 | 7 | 8 |
| Crystal grain size (nm) | 4 | 6 | 5 | 7 | 6 | 7 | 8 |
| Maximum crystal grain size (nm) | 6 | 8 | 7 | 6 | 6 | 8 | 7 |

TABLE 2

| Composition (% by mass) | Example 8 | Example 9 | Example 10 | Example 11 | Example 12 | Example 13 | Example 14 |
|---|---|---|---|---|---|---|---|
| $SiO_2$ | 51.60 | 51.60 | 55.60 | 49.60 | 53.60 | 47.60 | 47.60 |
| $P_2O_5$ | 0.00 | 0.00 | 0.00 | 0.00 | 0.00 | 0.00 | 1.00 |
| $Al_2O_3$ | 18.00 | 14.00 | 14.00 | 14.00 | 14.00 | 18.00 | 18.00 |
| $B_2O_3$ | 0.00 | 0.00 | 0.00 | 0.00 | 0.00 | 0.00 | 1.00 |
| $Li_2O$ | 2.00 | 2.00 | 2.00 | 2.00 | 2.00 | 0.00 | 0.00 |
| $K_2O$ | 0.00 | 0.00 | 0.00 | 0.00 | 0.00 | 0.00 | 0.00 |
| $Na_2O$ | 0.00 | 0.00 | 0.00 | 2.00 | 2.00 | 6.00 | 4.00 |
| MgO | 5.00 | 8.00 | 8.00 | 8.00 | 8.00 | 8.00 | 8.00 |
| CaO | 1.50 | 0.00 | 0.00 | 0.00 | 0.00 | 0.00 | 0.00 |
| BaO | 1.50 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 14.00 | 18.00 | 11.00 | 19.00 | 14.00 | 14.00 | 14.00 |
| $ZrO_2$ | 0.00 | 0.00 | 0.00 | 0.00 | 0.00 | 0.00 | 0.00 |
| $TiO_2$ | 6.00 | 6.00 | 6.00 | 6.00 | 6.00 | 6.00 | 6.00 |
| $Fe_2O_3$ | 0.00 | 0.00 | 3.00 | 0.00 | 0.00 | 0.00 | 0.00 |
| $CeO_2$ | 0.40 | 0.40 | 0.40 | 0.40 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 670 | 670 |
| Crystal growth temperature (° C.) | 750 | 750 | 750 | 750 | 750 | 770 | 800 |
| Specific gravity after crystallization | 2.834 | 2.867 | 2.871 | 2.890 | 2.790 | 2.822 | 2.852 |
| Vickers hardness | 740 | 750 | 750 | 770 | 750 | 750 | 750 |
| Young's modulus (Gpa) | 101 | 105 | 100 | 107 | 100 | 100 | 102 |
| E/ρ | 35.6 | 36.6 | 34.8 | 37.0 | 35.8 | 35.4 | 35.8 |
| $\sigma$ ($\times 10^{-7}$/° C.) (25° C.-100° C.) | 53 | 51 | 54 | 52 | 56 | 60 | 57 |
| Degree of crystallinity (% by mass) | 4 | 4 | 6 | 11 | 6 | 8 | 6 |
| Crystal grain size (nm) | 6 | 6 | 6 | 8 | 6 | 8 | 7 |
| Maximum crystal grain size (nm) | 8 | 8 | 8 | 10 | 8 | 11 | 9 |

TABLE 3

| Composition (% by mass) | Example 15 | Example 16 | Example 17 | Example 18 | Example 19 | Example 20 | Example 21 |
| --- | --- | --- | --- | --- | --- | --- | --- |
| $SiO_2$ | 48.60 | 49.60 | 46.60 | 49.60 | 45.60 | 47.60 | 49.60 |
| $P_2O_5$ | 3.00 | 5.00 | 1.00 | 1.00 | 1.00 | 1.00 | 0.00 |
| $Al_2O_3$ | 15.00 | 15.00 | 15.00 | 18.00 | 18.00 | 18.00 | 18.00 |
| $B_2O_3$ | 3.00 | 0.00 | 5.00 | 1.00 | 1.00 | 1.00 | 0.00 |
| $Li_2O$ | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $Na_2O$ | 4.00 | 4.00 | 6.00 | 4.00 | 4.00 | 4.00 | 4.00 |
| MgO | 6.00 | 6.00 | 6.00 | 8.00 | 8.00 | 6.00 | 8.00 |
| CaO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 14.00 | 14.00 | 14.00 | 14.00 | 14.00 | 16.00 | 14.00 |
| $ZrO_2$ | 0.00 | 0.00 | 0.00 | 0.00 | 0.00 | 0.00 | 0.00 |
| $TiO_2$ | 6.00 | 6.00 | 6.00 | 4.00 | 8.00 | 6.00 | 6.00 |
| $Fe_2O_3$ | 0.00 | 0.00 | 0.00 | 0.00 | 0.00 | 0.00 | 0.00 |
| $CeO_2$ | 0.40 | 0.40 | 0.40 | 0.40 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 670 | 670 |
| Crystal growth temperature (° C.) | 800 | 800 | 800 | 800 | 800 | 800 | 800 |
| Specific gravity after crystallization | 2.856 | 2.862 | 2.870 | 2.846 | 2.883 | 2.857 | 2.837 |
| Vickers hardness | 730 | 740 | 730 | 750 | 760 | 720 | 720 |
| Young's modulus (Gpa) | 105 | 103 | 102 | 102 | 108 | 105 | 103 |
| E/ρ | 36.8 | 36.0 | 35.5 | 35.8 | 37.5 | 36.8 | 36.3 |
| σ (×$10^{-7}$/° C.) (25° C. to 100° C.) | 55 | 55 | 52 | 56 | 57 | 53 | 51 |
| Degree of crystallinity (% by mass) | 5 | 5 | 5 | 6 | 8 | 4 | 4 |
| Crystal grain size (nm) | 5 | 6 | 6 | 6 | 8 | 7 | 6 |
| Maximum crystal grain size (nm) | 7 | 8 | 8 | 9 | 11 | 8 | 8 |

TABLE 4

| Composition (% by mass) | Example 22 | Example 23 | Example 24 | Example 25 | Example 26 | Example 27 | Example 28 |
| --- | --- | --- | --- | --- | --- | --- | --- |
| $SiO_2$ | 48.60 | 47.60 | 47.60 | 47.70 | 52.60 | 52.60 | 51.60 |
| $P_2O_5$ | 1.00 | 2.00 | 1.50 | 1.00 | 1.00 | 1.00 | 1.00 |
| $Al_2O_3$ | 18.00 | 17.00 | 17.00 | 18.00 | 17.00 | 14.00 | 12.00 |
| $B_2O_3$ | 1.00 | 1.00 | 1.50 | 1.00 | 0.00 | 5.00 | 5.00 |
| $Li_2O$ | 0.00 | 0.00 | 0.00 | 0.00 | 0.00 | 0.00 | 0.00 |
| $K_2O$ | 0.00 | 1.00 | 1.50 | 1.00 | 0.00 | 0.00 | 0.00 |
| $Na_2O$ | 4.00 | 4.00 | 4.00 | 4.00 | 4.00 | 4.00 | 6.00 |
| MgO | 8.00 | 7.00 | 7.00 | 8.00 | 6.00 | 4.50 | 5.00 |
| CaO | 0.00 | 1.50 | 1.50 | 0.00 | 2.00 | 2.00 | 2.00 |
| BaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 14.00 | 13.00 | 12.50 | 14.00 | 12.00 | 11.50 | 12.00 |
| $ZrO_2$ | 0.00 | 0.00 | 0.00 | 0.00 | 0.00 | 0.00 | 0.00 |
| $TiO_2$ | 5.00 | 5.50 | 5.50 | 5.00 | 5.00 | 5.00 | 5.00 |
| $Fe_2O_3$ | 0.00 | 0.00 | 0.00 | 0.00 | 0.00 | 0.00 | 0.00 |
| $CeO_2$ | 0.40 | 0.40 | 0.40 | 0.30 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 670 | 670 |
| Crystal growth temperature (° C.) | 800 | 800 | 800 | 750 | 750 | 750 | 750 |
| Specific gravity after crystallization | 2.860 | 2.850 | 2.836 | 2.863 | 2.781 | 2.705 | 2.708 |
| Vickers hardness | 720 | 720 | 720 | 750 | 720 | 710 | 700 |
| Young's modulus (Gpa) | 103 | 106 | 103 | 106 | 106 | 98 | 100 |
| E/ρ | 36.0 | 37.2 | 36.3 | 37.0 | 38.1 | 36.2 | 36.9 |

TABLE 4-continued

| Composition (% by mass) | Example 22 | Example 23 | Example 24 | Example 25 | Example 26 | Example 27 | Example 28 |
|---|---|---|---|---|---|---|---|
| σ (×10⁻⁷/° C.) (25° C. to 100° C.) | 54 | 52 | 61 | 52 | 53 | 50 | 60 |
| Degree of crystallinity (% by mass) | 6 | 8 | 8 | 10 | 5 | 3 | 4 |
| Crystal grain size (nm) | 7 | 7 | 8 | 8 | 5 | 5 | 6 |
| Maximum crystal grain size (nm) | 9 | 9 | 10 | 11 | 8 | 8 | 8 |

TABLE 5

| Composition (% by mass) | Example 29 | Example 30 | Example 31 | Example 32 | Example 33 | Example 34 | Example 35 |
|---|---|---|---|---|---|---|---|
| $SiO_2$ | 47.60 | 47.60 | 51.60 | 49.60 | 52.60 | 52.10 | 51.60 |
| $P_2O_5$ | 1.00 | 1.00 | 1.00 | 0.00 | 0.00 | 0.50 | 1.00 |
| $Al_2O_3$ | 18.00 | 15.00 | 12.00 | 15.00 | 12.00 | 12.00 | 13.00 |
| $B_2O_3$ | 1.00 | 1.00 | 1.00 | 1.00 | 1.00 | 3.00 | 3.00 |
| $Li_2O$ | 0.00 | 0.00 | 0.00 | 0.00 | 0.00 | 0.00 | 0.00 |
| $K_2O$ | 0.00 | 3.00 | 3.00 | 3.00 | 3.00 | 2.00 | 0.00 |
| $Na_2O$ | 4.00 | 6.00 | 6.00 | 6.00 | 6.00 | 6.00 | 6.00 |
| MgO | 4.00 | 4.00 | 4.00 | 4.00 | 4.00 | 5.00 | 5.00 |
| CaO | 2.00 | 2.00 | 2.00 | 2.00 | 2.00 | 2.00 | 3.00 |
| BaO | 1.00 | 1.00 | 1.00 | 1.00 | 1.00 | 0.00 | 0.00 |
| SrO | 1.00 | 1.00 | 1.00 | 1.00 | 1.00 | 0.00 | 0.00 |
| ZnO | 14.00 | 12.00 | 12.00 | 12.00 | 12.00 | 12.00 | 12.00 |
| $ZrO_2$ | 0.00 | 0.00 | 0.00 | 0.00 | 0.00 | 0.00 | 0.00 |
| $TiO_2$ | 6.00 | 6.00 | 5.00 | 5.00 | 5.00 | 5.00 | 5.00 |
| $Fe_2O_3$ | 0.00 | 0.00 | 0.00 | 0.00 | 0.00 | 0.00 | 0.00 |
| $CeO_3$ | 0.40 | 0.40 | 0.40 | 0.40 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ $R_2TiO_4$ | $R_2TiO_4$ | $R_2TiO_4$ | $R_2TiO_4$ | $R_2TiO_4$ | $RAl_2O_4$ |
| Nucleation temperature (° C.) | 670 | 650 | 650 | 650 | 670 | 670 | 670 |
| Crystal growth temperature (° C.) | 750 | 750 | 750 | 750 | 780 | 750 | 750 |
| Specific gravity after crystallization | 2.880 | 2.784 | 2.747 | 2.771 | 2.792 | 2.775 | 2.712 |
| Vickers hardness | 720 | 720 | 720 | 730 | 730 | 750 | 740 |
| Young's modulus (Gpa) | 103 | 105 | 102 | 98 | 101 | 102 | 102 |
| E/ρ | 36.8 | 37.7 | 37.1 | 35.4 | 36.2 | 36.8 | 37.6 |
| σ (×10⁻⁷/° C.) (25° C. to 100° C.) | 58 | 62 | 64 | 69 | 70 | 63 | 59 |
| Degree of crystallinity (% by mass) | 8 | 8 | 7 | 5 | 9 | 11 | 7 |
| Crystal grain size (nm) | 6 | 5 | 5 | 5 | 6 | 8 | 8 |
| Maximum crystal grain size (nm) | 8 | 7 | 7 | 8 | 8 | 9 | 9 |

TABLE 6

| Composition (% by mass) | Example 36 | Example 37 | Example 38 | Example 39 | Example 40 | Example 41 | Example 42 |
|---|---|---|---|---|---|---|---|
| $SiO_2$ | 51.60 | 51.60 | 51.60 | 47.70 | 47.60 | 47.60 | 47.70 |
| $P_2O_5$ | 1.00 | 1.00 | 1.00 | 1.00 | 2.00 | 1.50 | 1.00 |
| $Al_2O_3$ | 13.00 | 13.00 | 15.00 | 18.00 | 17.00 | 17.00 | 17.00 |
| $B_2O_3$ | 3.00 | 1.00 | 1.00 | 1.00 | 1.00 | 1.50 | 1.00 |
| $Li_2O$ | 0.00 | 0.00 | 0.00 | 0.00 | 0.00 | 0.00 | 0.00 |
| $K_2O$ | 0.00 | 0.00 | 0.00 | 0.50 | 1.00 | 1.50 | 2.00 |
| $Na_2O$ | 6.00 | 6.00 | 6.00 | 4.00 | 4.00 | 4.00 | 4.00 |
| MgO | 5.00 | 5.00 | 5.00 | 3.00 | 7.00 | 7.00 | 7.50 |
| CaO | 2.00 | 3.00 | 3.00 | 0.00 | 1.50 | 1.50 | 0.00 |
| BaO | 0.00 | 0.00 | 0.00 | 0.00 | 0.00 | 0.00 | 0.00 |

TABLE 6-continued

| Composition (% by mass) | Example 36 | Example 37 | Example 38 | Example 39 | Example 40 | Example 41 | Example 42 |
|---|---|---|---|---|---|---|---|
| SrO | 0.00 | 0.00 | 0.00 | 0.00 | 0.00 | 0.00 | 0.00 |
| ZnO | 13.00 | 13.00 | 12.00 | 14.00 | 13.00 | 12.50 | 13.50 |
| $ZrO_2$ | 0.00 | 0.00 | 0.00 | 0.00 | 0.00 | 0.00 | 0.00 |
| $TiO_2$ | 5.00 | 6.00 | 5.00 | 5.50 | 5.50 | 5.50 | 6.00 |
| $Fe_2O_3$ | 0.00 | 0.00 | 0.00 | 0.00 | 0.00 | 0.00 | 0.00 |
| $CeO_3$ | 0.40 | 0.40 | 0.40 | 0.30 | 0.40 | 0.40 | 0.30 |
| Total | 100.00 | 100.00 | 100.00 | 100.00 | 100.00 | 100.00 | 100.00 |
| Main crystal phase | $RAl_2O_4$ | $RAl_3O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 670 | 670 |
| Crystal growth temperature (° C.) | 750 | 750 | 750 | 780 | 780 | 780 | 780 |
| Specific gravity after crystallization | 2.725 | 2.713 | 2.726 | 2.866 | 2.841 | 2.833 | 2.840 |
| Vickers hardness | 740 | 720 | 730 | 780 | 750 | 770 | 750 |
| Young's modulus (Gpa) | 105 | 102 | 103 | 102 | 101 | 102 | 105 |
| E/ρ | 38.5 | 37.6 | 37.8 | 35.6 | 35.6 | 36.0 | 37.0 |
| σ ($\times 10^{-7}$/° C.) (25° C. to 100° C.) | 60 | 56 | 56 | 52 | 53 | 53 | 57 |
| Degree of crystallinity (% by mass) | 8 | 5 | 6 | 13 | 8 | 9 | 5 |
| Crystal grain size (nm) | 7 | 6 | 6 | 8 | 6 | 7 | 7 |
| Maximum crystal grain size (nm) | 8 | 9 | 9 | 12 | 8 | 9 | 9 |

TABLE 7

| Composition (% by mass) | Example 43 | Example 44 | Example 45 | Example 46 | Example 47 | Example 48 | Example 49 |
|---|---|---|---|---|---|---|---|
| $SiO_2$ | 47.70 | 47.20 | 51.70 | 53.70 | 57.70 | 47.70 | 51.70 |
| $P_2O_5$ | 1.00 | 1.00 | 1.00 | 1.00 | 1.00 | 1.00 | 1.00 |
| $Al_2O_3$ | 17.00 | 18.00 | 14.00 | 18.00 | 14.00 | 18.00 | 18.00 |
| $B_2O_3$ | 1.00 | 1.00 | 1.00 | 1.00 | 1.00 | 1.00 | 1.00 |
| $Li_2O$ | 0.00 | 0.50 | 0.00 | 0.00 | 0.00 | 0.00 | 0.00 |
| $K_2O$ | 0.00 | 0.00 | 0.00 | 0.00 | 0.00 | 0.00 | 0.00 |
| $Na_2O$ | 6.00 | 4.00 | 8.00 | 4.00 | 4.00 | 4.00 | 4.00 |
| MgO | 7.50 | 8.00 | 4.00 | 2.00 | 2.00 | 4.00 | 4.00 |
| CaO | 0.00 | 0.00 | 0.00 | 0.00 | 0.00 | 4.00 | 0.00 |
| BaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 13.50 | 14.00 | 14.00 | 14.00 | 14.00 | 14.00 | 14.00 |
| $ZrO_2$ | 0.00 | 0.00 | 0.00 | 0.00 | 0.00 | 0.00 | 0.00 |
| $TiO_2$ | 6.00 | 6.00 | 6.00 | 6.00 | 6.00 | 6.00 | 6.00 |
| $Fe_2O_3$ | 0.00 | 0.00 | 0.00 | 0.00 | 0.00 | 0.00 | 0.00 |
| $CeO_3$ | 0.30 | 0.30 | 0.30 | 0.30 | 0.30 | 0.30 | 0.30 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 650 | 650 | 650 | 670 | 670 | 670 | 670 |
| Crystal growth temperature (° C.) | 780 | 780 | 750 | 780 | 780 | 780 | 780 |
| Specific gravity after crystallization | 2.837 | 2.879 | 2.747 | 2.761 | 2.695 | 2.874 | 2.802 |
| Vickers hardness | 750 | 750 | 770 | 760 | 740 | 740 | 740 |
| Young's modulus (Gpa) | 105 | 108 | 98 | 102 | 105 | 102 | 106 |
| E/ρ | 37.0 | 37.5 | 35.7 | 36.9 | 39.0 | 35.5 | 37.8 |
| σ ($\times 10^{-7}$/° C.) (25° C. to 100° C.) | 58 | 55 | 67 | 52 | 54 | 53 | 58 |
| Degree of crystallinity (% by mass) | 10 | 12 | 6 | 10 | 8 | 11 | 12 |
| Crystal grain size (nm) | 8 | 8 | 6 | 7 | 6 | 6 | 8 |
| Maximum crystal grain size (nm) | 10 | 12 | 8 | 10 | 8 | 12 | 12 |

TABLE 8

| Composition (% by mass) | Example 50 | Example 51 | Example 52 | Example 53 | Example 54 | Example 55 | Example 56 |
|---|---|---|---|---|---|---|---|
| $SiO_2$ | 51.70 | 54.10 | 53.60 | 52.10 | 52.60 | 52.60 | 53.10 |
| $P_2O_5$ | 1.00 | 0.00 | 0.00 | 0.00 | 1.00 | 1.00 | 1.00 |
| $Al_2O_3$ | 18.00 | 18.00 | 17.00 | 18.00 | 15.00 | 13.00 | 14.00 |
| $B_2O_3$ | 1.00 | 0.00 | 0.00 | 0.00 | 3.00 | 5.00 | 5.00 |
| $Li_2O$ | 0.00 | 0.00 | 0.00 | 0.00 | 0.00 | 0.00 | 0.00 |
| $K_2O$ | 2.00 | 0.00 | 0.00 | 2.00 | 0.00 | 0.00 | 0.00 |
| $Na_2O$ | 4.00 | 4.00 | 4.00 | 4.00 | 4.00 | 4.00 | 4.00 |
| MgO | 2.00 | 6.00 | 6.00 | 6.00 | 5.00 | 5.00 | 4.50 |
| CaO | 0.00 | 0.00 | 2.00 | 0.00 | 2.00 | 2.00 | 2.00 |
| BaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| ZnO | 14.00 | 12.00 | 12.00 | 12.00 | 12.00 | 12.00 | 11.50 |
| $ZrO_2$ | 0.00 | 0.00 | 0.00 | 0.00 | 0.00 | 0.00 | 0.00 |
| $TiO_2$ | 6.00 | 5.50 | 5.00 | 5.50 | 5.00 | 5.00 | 4.50 |
| $Fe_2O_3$ | 0.00 | 0.00 | 0.00 | 0.00 | 0.00 | 0.00 | 0.00 |
| $CeO_3$ | 0.30 | 0.40 | 0.40 | 0.40 | 0.40 | 0.40 | 0.40 |
| Total | 100.00 | 100.00 | 100.00 | 100.00 | 100.00 | 100.00 | 100.00 |
| Main crystal phase | $RAl_2O_4$ | $RAl_2O_4$ | $RAl_2O_4$ | $RAl_2O_4$ | $RAl_2O_4$ | $RAl_2O_4$ | $RAl_2O_4$ |
| Nucleation temperature (° C.) | 670 | 670 | 670 | 670 | 670 | 650 | 650 |
| Crystal growth temperature (° C.) | 780 | 780 | 780 | 780 | 780 | 750 | 750 |
| Specific gravity after crystallization | 2.764 | 2.767 | 2.781 | 2.780 | 2.743 | 2.697 | 2.693 |
| Vickers hardness | 750 | 750 | 770 | 770 | 730 | 740 | 730 |
| Young's modulus (Gpa) | 102 | 105 | 112 | 110 | 103 | 105 | 102 |
| E/ρ | 36.9 | 37.9 | 40.3 | 39.6 | 37.6 | 38.9 | 37.9 |
| σ (×$10^{-7}$/° C.) (25° C. to 100° C.) | 61 | 55 | 56 | 60 | 51 | 52 | 53 |
| Degree of crystallinity (% by mass) | 7 | 6 | 12 | 12 | 8 | 5 | 4 |
| Crystal grain size (nm) | 7 | 8 | 9 | 9 | 7 | 7 | 8 |
| Maximum crystal grain size (nm) | 9 | 9 | 11 | 10 | 10 | 9 | 10 |

TABLE 9

| Composition (% by mass) | Example 57 | Example 58 | Example 59 | Example 60 | Example 61 |
|---|---|---|---|---|---|
| $SiO_2$ | 60.60 | 47.45 | 46.95 | 49.90 | 49.90 |
| $P_2O_5$ | 1.00 | 1.00 | 1.00 | 1.00 | 1.00 |
| $Al_2O_3$ | 14.00 | 15.50 | 16.00 | 16.00 | 16.00 |
| $B_2O_3$ | 7.00 | 3.00 | 3.00 | 3.00 | 3.00 |
| $Li_2O$ | 0.00 | 0.00 | 0.00 | 0.00 | 0.00 |
| $K_2O$ | 0.00 | 0.00 | 0.00 | 0.00 | 0.00 |
| $Na_2O$ | 4.00 | 5.50 | 5.50 | 4.00 | 4.00 |
| MgO | 4.50 | 6.25 | 6.25 | 6.25 | 6.25 |
| CaO | 2.00 | 1.00 | 1.00 | 1.00 | 1.00 |
| BaO | 0.00 | 1.00 | 1.00 | 0.00 | 0.00 |
| SrO | 0.00 | 0.00 | 0.00 | 0.00 | 0.00 |
| ZnO | 11.50 | 13.70 | 13.70 | 12.75 | 12.75 |
| $ZrO_2$ | 0.00 | 0.00 | 0.00 | 0.00 | 0.00 |
| $TiO_2$ | 5.00 | 5.00 | 5.00 | 5.50 | 5.50 |
| $Fe_2O_3$ | 0.00 | 0.00 | 0.00 | 0.00 | 0.00 |
| $CeO_2$ | 0.40 | 0.60 | 0.60 | 0.60 | 0.60 |
| Total | 100.00 | 100.00 | 100.00 | 100.00 | 100.00 |
| Main Crystal phase | $RAl_2O_4$ | $RAl_2O_4$ | $RAl_2O_4$ | $RAl_2O_4$ | $RAl_2O_4$ |
| Nucleation temperature (° C.) | 650 | — | — | — | — |
| Crystal growth temperature (° C.) | 750 | 730 | 730 | 700 | 750 |
| Specific gravity after crystallization | 2.690 | 3.820 | 2.824 | 2.740 | 2.782 |
| Vickers hardness | 730 | 660 | 660 | 660 | 670 |
| Young's modulus (Gpa) | 98 | 90 | 91 | 92 | 95 |
| E/ρ | 36.4 | 31.9 | 32.2 | 33.6 | 34.1 |
| σ (×$10^{-7}$/° C.) (25° C. to 100° C.) | 56 | 58 | 57 | 57 | 58 |
| Degree of crystallinity (% by mass) | 2 | 6 | 6 | 2 | 4 |
| Crystal grain size (nm) | 5 | 5 | 5 | 4 | 6 |
| Maximum crystal grain size (nm) | 7 | 8 | 8 | 8 | 9 |

TABLE 10

| Composition (% by mass) | Comparative Example 1 | Comparative Example 2 | Comparative Example 3 |
|---|---|---|---|
| $SiO_2$ | 53.60 | 51.10 | 50.40 |
| $P_2O_5$ | | | |
| $Al_2O_3$ | 18.00 | 19.00 | 16.80 |
| $B_2O_3$ | | 9.50 | 8.40 |
| $Li_2O$ | | 0.20 | |
| $K_2O$ | | 2.00 | 2.00 |
| $Na_2O$ | | 8.50 | 7.50 |
| MgO | 6.00 | 1.50 | 5.40 |
| CaO | | 0.30 | 0.40 |
| BaO | 4.00 | | |
| SrO | | | |
| ZnO | 12.00 | 4.00 | 4.00 |
| $ZrO_2$ | | 1.00 | 1.40 |

TABLE 10-continued

| Composition (% by mass) | Comparative Example 1 | Comparative Example 2 | Comparative Example 3 |
|---|---|---|---|
| $TiO_2$ | 6.00 | 2.50 | 3.30 |
| $Fe_2O_3$ | | | |
| $CeO_2$ | 0.40 | 0.40 | 0.40 |
| Total | 100.00 | 100.00 | 100.00 |
| Main Crystal phase | $RAl_2O_4$ | — | — |
| Nucleation temperature (° C.) | 800 | 800 | 800 |
| Crystal growth temperature (° C.) | 950 | 950 | 950 |
| Specific gravity after crystallization | 3.500 | — | — |
| Vickers hardness | 950 | — | — |
| Young's modulus (Gpa) | 120 | — | — |
| E/ρ | 36.0 | — | — |
| σ (×10$^{-7}$/° C.) (25° C. to 100° C.) | 62 | — | — |
| Degree of crystallinity (% by mass) | 28 | — | — |
| Crystal grain size (nm) | 60 | — | — |
| Maximum crystal grain size (nm) | 90 | — | — |

The fracture toughness ($K_{1C}$) was 1.7 in Example 14. Furthermore, the fracture toughness ($K_{1C}$) was 2.0 in Example 19.

The substrate for HDD takes a condition ready for forming a magnetic film or an underlying film after performing a predetermined heat treatment to the glass prepared by a direct press method through a hole cutting step at central portion, grinding and polishing steps at inner and outer periphery, and both-side grinding and polishing steps. Furthermore, the substrate is optionally subjected to a chemical strengthening treatment. Various embodiments are envisaged with respect to the chemical strengthening treatment:

case of directly treating the substrate after performing all polishing steps;

case of performing the chemical strengthening; after finishing a grinding and a polishing steps at inner and outer periphery and a surface polishing step; and then performing a polishing step (in this case, the chemical strengthening layer exists mainly at inner periphery and outer periphery); and case of performing the chemical strengthening; after finishing a grinding and a polishing steps at inner periphery of the substrate, a grinding step at outer periphery, and a surface polishing step; and then performing a polishing step at outer periphery and a polishing step at both surfaces (in this case, the chemical strengthening layer exists mainly at an inner periphery). The surface of inner periphery affects the ring flexural strength of the substrate the most, therefore, any treatment methods of (1), (2), and (3) are effective to enhance the ring flexural strength of the substrate. The method of (1) was employed in Examples 62 to 65 shown below. The method of (3) was employed in Examples 66 and 67.

Example 62

The polished substrate for 2.5 inch HDD (65φ×0.635 mmt) of Example 14 was immersed into a mixed salt of potassium nitrate and sodium nitrate ($KNO_3$:$NaNO_3$=1:3) at 400 degree C. for 0.25 hour to form a compression stress layer at the surface. It was confirmed for the substrate that the ring flexural strength has increased by 3 times of that (450 MPa) before forming the compression stress layer. In this connection, the "ring flexural strength" as used herein refers to a flexural strength which is measured by a concentric circle flexural method of preparing a thin circular disc sample with diameter 65 mm and thickness 0.635 mm and measuring the strength of the circular disc sample using a circular supporting ring and a load ring. It was also confirmed that the fracture toughness ($K_{1C}$) has increased to 2.3.

Example 63

The polished substrate for 2.5 inch HDD (65φ×0.635 mmt) of Example 14 was immersed into potassium nitrate salt ($KNO_3$) at 400 degree C. for 0.5 hour to form a compression stress layer at the surface. It was confirmed for the substrate that the ring flexural strength has increased by 4 times of that (450 MPa) before forming the compression stress layer. It was also confirmed that the fracture toughness ($K_{1C}$) has increased to 2.4.

Example 64

The polished substrate for 2.5 inch HDD (65φ×0.635 mmt) of Example 14 was heated to from 300 degrees C. to 600 degrees C. and then rapidly cooled by an air-cooling process thereby to form a compression stress layer at the surface. It was confirmed for the substrate that the ring flexural strength and the fracture toughness ($K_{1C}$) have increased.

Example 65

Furthermore, the polished substrate for 2.5 inch HDD (65φ×0.635 mmt) of Example 19 was prepared by a publicly known process and immersed into a mixed salt of potassium nitrate and sodium nitrate ($KNO_3$:$NaNO_3$=1:3) at 400 degree C. for 0.25 hour to form a compression stress layer at the surface. It was confirmed for the substrate that the ring flexural strength has increased by 2 to 3 times of that (470 MPa) before forming the compression stress layer. It was confirmed that the fracture toughness ($K_{1C}$) has increased to 2.2.

Example 66

Furthermore, the substrate for 2.5 inch HDD of Example 60 was immersed into potassium nitrate salt ($KNO_3$) at 500 degree C. for 0.17 hour to form a compression stress layer at the surface. It was confirmed for the substrate that the ring flexural strength has increased by 5 times of that (450 MPa) before forming the compression stress layer. It was also confirmed that the fracture toughness ($K_{1C}$) was 4.0. The region where $Na^+$ has been exchanged to $K^+$ through strengthening the glass substrate was determined by a SEM/EDX apparatus (Scanning Electron Microscope/Energy Dispersive X-ray Spectroscopy); as a result, the region was 3.0 μm.

Example 67

Furthermore, the substrate for 2.5 inch HDD of Example 60 was immersed into a mixed salt of potassium nitrate and sodium nitrate ($KNO_3$:$NaNO_3$=1:3) at 500 degree C. for 0.17 hour to form a compression stress layer at the surface. It was confirmed for the substrate that the ring flexural strength had increased by 2 times of that (450 MPa) before forming the compression stress layer. It was also confirmed that the fracture toughness ($K_{1C}$) was 4.0. The region where $Na^+$ has been exchanged to $K^+$ through strengthening the glass substrate was determined by a SEM/EDX apparatus; as a result, the region was 2.0 μm.

Example 68

A polished substrate for 2.5 inch HDD (65φ×0.635 mmt) with the crystallized glass composition of Example 14 was prepared by a publicly known process through a polishing step containing a chemical strengthening step and the surface of the substrate was observed for a viewing field of 3 μm² using an AFM; as a result, Ra: 1.24 Å, Rq: 1.57 Å, Rmax: 35.21 Å, micro-waviness (μWa): 0.56 Å, demonstrating very excellent properties as the surface properties required to the substrate for HDD of the next generation.

The micro-waviness (μWa) is one of factors which affect the electromagnetic conversion property of magnetic recording media, and it is necessary to decrease the micro-waviness similarly as Ra in order to make the electromagnetic conversion property excellent. The measurement of the micro-waviness is exemplified by a method of optical interferometry (apparatus: MicroXAM) under a condition in a band pass filter of 50 to 200 nm in circumferential directions of 0°, 90°, 180°, and 270° at upper and lower surfaces of the substrate. An actual measurement is not limited to the method.

Example 69

Furthermore, a chromium alloy foundation layer and a cobalt alloy magnetic layer were applied and a diamond-like carbon layer was further formed on the substrates obtained in Examples described above, then a perfluoro polyether lubricant was coated thereto thereby to obtain information magnetic recording media.

With respect to the substrate for magnetic recording medium of the present invention, surface recording density can be increased, deflection or deformation does not generate even under higher revolution of the substrate itself in order to increase the recording density, vibration due to the revolution can be reduced, and the number of errors (TMR) in reading data due to vibration or deflection can be decreased. Moreover, since the impact resistance is excellent, head crush or substrate breakage is unlikely to occur when the substrate is used for information recording media of mobile application in particular; consequently, excellent stable motion and magnetic recording reproduction properties can be exhibited.

What is claimed is:

1. A crystallized glass substrate for information recording medium, consisting of a crystallized glass which comprises the components of
   $SiO_2$ of from 40% to 60%,
   $Al_2O_3$ of from 7% to 20%, and
   RO of from 5% to 35% in terms of % by mass on the oxide basis, wherein R is one or more selected from Zn, Mg and Fe,
   $Na_2O$ of from 2% to 15% and
   which comprises one or more selected from $RAl_2O_4$ and $R_2TiO_4$ as a main crystal phase, wherein R is one or more selected from Zn, Mg and Fe, and wherein the main crystal phase has a crystal grain size in a range of from 0.5 nm to 20 nm, a degree of crystallinity of 15% or less, and a specific gravity of 3.00 or less.

2. The crystallized glass substrate for information recording medium according to claim 1, wherein RO is one or more selected from a ZnO component, a MgO component and a FeO component, and wherein the ZnO component is included in the crystallized glass substrate in an amount of from 5% to 25% in terms of % by mass on the oxide basis.

3. The crystallized glass substrate for information recording medium according to claim 1, further comprising the component
   $TiO_2$ of from 1% to 15%.

4. The crystallized glass substrate for information recording medium according to claim 1, further comprising the components of
   $Li_2O$ of from 0% to 5%, and/or
   $K_2O$ of from 0% to 10% in terms of % by mass on the oxide basis.

5. The crystallized glass substrate for information recording medium according to claim 1, further comprising the components of
   $P_2O_5$ of from 0% to 7%, and/or
   $B_2O_3$ of 0% or more and less than 8%, and/or
   MgO of from 0% to 15%, and/or
   CaO of from 0% to 15%, and/or
   SrO of from 0% to 5%, and/or
   BaO of from 0% to 5%, and/or
   FeO of from 0% to 8%, and/or
   $ZrO_2$ of from 0% to 10% in terms of % by mass on the oxide basis.

6. The crystallized glass substrate for information recording medium according to claim 1, wherein a first compression stress layer is formed at one or both of outer periphery edge and inner periphery edge of the crystallized glass substrate for information recording medium.

7. The crystallized glass substrate for information recording medium according to claim 1, wherein a second compression stress layer is formed at one or both of two main surfaces of the crystallized glass substrate for information recording medium and the thickness of the second compression stress layer is less than 30 μm.

8. The crystallized glass substrate for information recording medium according to claim 1, wherein the crystallized glass contains one or both of $SnO_2$ and $CeO_2$ components and total of the both components is from 0.01% to 1.0% in terms of % by mass on the oxide basis.

9. The crystallized glass substrate for information recording medium according to claim 1, wherein the crystallized glass contains no $As_2O_3$ or $Sb_2O_3$ component on the oxide basis and no $Cl^-$, $NO^-$, $SO^{2-}$, or $F^-$ component.

10. The crystallized glass substrate for information recording medium according to claim 1, wherein surface roughness Ra (arithmetic average roughness) of the substrate is 2 angstroms or less.

11. The crystallized glass substrate for information recording medium according to claim 1, wherein fracture toughness $K_{1C}$ is 1.0 or more, Young's modulus is 85 GPa or more, and ratio of Young's modulus to specific gravity (Young's modulus/specific gravity) is 31.4 or more.

12. An information recording medium, using the crystallized glass substrate for information recording medium according to claim 1.

* * * * *